United States Patent
Boyer

(10) Patent No.: US 9,411,792 B2
(45) Date of Patent: Aug. 9, 2016

(54) DOCUMENT ORDER MANAGEMENT VIA BINARY TREE PROJECTION

(71) Applicant: International Business Machines Corporation, Armonk, NY (US)

(72) Inventor: John M. Boyer, Victoria (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 202 days.

(21) Appl. No.: 14/193,514

(22) Filed: Feb. 28, 2014

(65) Prior Publication Data

US 2014/0331120 A1 Nov. 6, 2014

(30) Foreign Application Priority Data

May 6, 2013 (CA) .................................... 2815153

(51) Int. Cl.
*G06F 3/00* (2006.01)
*G06F 17/22* (2006.01)

(52) U.S. Cl.
CPC .......... *G06F 17/2247* (2013.01); *G06F 17/227* (2013.01)

(58) Field of Classification Search
CPC .......................... G06F 17/2247; G06F 17/227
See application file for complete search history.

(56) References Cited

U.S. PATENT DOCUMENTS

| 6,826,726 | B2 | 11/2004 | Hsing et al. |
| 6,938,204 | B1 | 8/2005 | Hind et al. |
| 8,112,704 | B2 | 2/2012 | Clarke et al. |
| 2004/0002952 | A1 | 1/2004 | Lee et al. |
| 2005/0203957 | A1 | 9/2005 | Wang et al. |
| 2006/0036955 | A1* | 2/2006 | Baudisch .............. G06F 3/0481 715/747 |
| 2007/0156750 | A1 | 7/2007 | Calahan |
| 2009/0106286 | A1 | 4/2009 | Chakraborty et al. |

OTHER PUBLICATIONS

Haustein et al., "DeweyIDs—The Key to Fine-Grained Management of XML Documents," 2010.*
IBM, "Ordered and Optimized DOM Initialization," IP.com No. IPCOM000013688D, Publication Date: Sep. 1, 2001, 3 pages.

* cited by examiner

*Primary Examiner* — Kyle Stork
(74) *Attorney, Agent, or Firm* — Cantor Colburn LLP

(57) ABSTRACT

An illustrative embodiment includes processing parse tree data. A parse tree data structure that is representative of a document object model (DOM) tree data structure is received. The parse tree data structure is projected onto a data structure that includes a binary tree. The projecting includes storing a projection that includes an association between each DOM node and a respective associated binary tree node, thereby creating a map between the parse tree data structure and the binary tree data structure. Requests to manipulate the parse tree and binary tree data structures that include node inserts and document order comparisons are also performed.

20 Claims, 12 Drawing Sheets

DOCUMENT ORDER MANAGEMENT VIA BINARY TREE PROJECTION

PRIORITY

This application claims priority to Canadian Patent Application No. 2,815,153, filed May 6, 2013, and all the benefits accruing therefrom under 35 U.S.C. §119, the contents of which in its entirety are herein incorporated by reference.

BACKGROUND

This disclosure relates generally to information and data management in a data processing system and, more specifically, to manipulating a parse tree structure and efficiently performing node order comparisons within the parse tree in support of a tree order enforcing expression language.

Data formats such as extensible markup language (XML) or JavaScript® Object Notation (JSON) are typically syntactically parsed into a general tree data structure containing a logical node for each pertinent syntactic component of the data. Regardless of the data format, this parse tree data structure is referred to as a document object model (DOM). Each node of a DOM typically contains information about the syntactic component being represented, such as an XML element tag name or content value, as well as index or pointer values that bind the DOM node into the tree structure, including an indicator of the parent, preceding sibling and next sibling, a child list, and possibly a separate attribute list. The document order of a DOM corresponds to a visitation order of DOM nodes resulting from a depth first traversal of the DOM tree. A depth first traversal, also known as a pre-order traversal, is a traversal of a tree structure in which a node is deemed visited or processed before any of its child nodes are visited or processed.

Creating a DOM for data enables querying or mutation of the data using an application programming interface (API) interface to the DOM. A tree addressing scheme is used to indicate a particular node or a set of nodes in the DOM. For example, an XML path language, XPath (a query language for selecting nodes from an XML document) expression can be used to obtain an XML node or set of nodes, and a dotted JavaScript notation expression can be used to obtain a JSON object. Typically, during the execution of either expression and production of a respective result, the referenced nodes are navigated in an organized manner relative to the DOM structure. For example, each XPath location step produces a set of nodes, in document order, before proceeding to a next location step. A key factor in placing nodes in document order is a DOM node comparator that determines which of two given DOM nodes is earlier in document order.

Once a DOM node (or set of nodes) is obtained, both informational and structural mutations can then be performed using the API, including changing tag names or content values (informational mutation) or performing insert and delete operations on a DOM node or nodes (structural mutation, or structural manipulation of the parse tree data structure).

Given two distinct DOM tree nodes of node $D_X$ and node $D_Y$, the DOM tree traversal comparison method first traverses the parent links of node $D_X$ and node $D_Y$ to find the closest common ancestor node A (in this example). If one of node $D_X$ and node $D_Y$ is the ancestor node A, then the node equivalent to node A is the earlier node in document order. Otherwise, the children node $C_X$ and node $C_Y$ of the closest common ancestor A are obtained; where node $C_X$ is the root node of the DOM sub-tree containing node $D_X$, and node $C_Y$ is the root node of the DOM sub-tree containing node $D_Y$. When node $C_X$ is earlier in the child list of node A, then node $D_X$ is the earlier node in document order, and otherwise node $D_Y$ is the earlier node in document order.

An advantage of the DOM tree traversal comparison method is that the method places no encumbrance on insert and delete operations, which normally have an O(1) cost for structural manipulations of the DOM. However a disadvantage of the method is the comparison can require O(n) time, where n is the traversal length of the tree path (node $D_X$, ... node $C_X$, ..., node $C_Y$, ... node $D_Y$) that excludes node A. The comparison operation most typically becomes expensive in a DOM due to node A having a large number of children, for example, there is an O(n) distance between node $C_X$ and node $C_Y$.

To mitigate this disadvantage, a common practice is use of a node index method. The node index method performs a depth first search operation to associate a depth-first index (DFI), with each DOM node. The node index method has an O(N) cost, where N is the number of DOM nodes visited and indexed, but the advantage is that once the indexing operation is performed, all subsequent comparison operations have a very fast O(1) cost to compare the DFIs of the node $D_X$ and node $D_Y$, where the node with the lesser DFI is determined to be the earlier node. The disadvantage is that this efficiency only lasts until a next insert operation occurs, which alters the DOM structure. Since the newly inserted node or nodes do not have an associated DFI value, a common practice is to mark the whole node index map as stale and revert to using the DOM tree traversal comparison method.

To mitigate this problem, a depth first search after each mutation sequence (for example, script) can be used to re-index the nodes, which clear a stale flag and restore a previously efficient node comparison operation. However, mutation scripts containing few structural mutations in relation to a number of informational mutations tend to run faster by re-indexing after each insert operation. On the other hand, re-indexing after each insert operation places an O(N) worst case cost on each insert operation, so mutation scripts containing many structural manipulations of the parse tree data structure tend to run much slower due to re-indexing after each insert operation.

In a further proposed solution, a 2010 paper in the Journal of Information and Data Management: DeweyIDs—The Key to Fine-Grained Management of XML Documents, focuses optimization of XML document storage and retrieval in XML databases. The DeweyID proposal is derived from the Dewey decimal system of organizing library books. The DeweyID is a single key comprised of a variable number of integer index values that help achieve efficient B*-tree operations relative to prior XML database systems. While appropriate for XML databases and B*-tree operations, the DeweyID proposal is not appropriate for implementing efficient node comparison and structural mutation of an in-memory DOM.

SUMMARY

Embodiments include a method, computer program product and apparatus for processing parse tree data. The method includes receiving a parse tree data structure, wherein the parse tree data structure is representative of a document object model (DOM) tree data structure. The parse tree data structure is projected onto a data structure that includes a binary tree. The projecting includes storing a projection that includes an association between each DOM node and a respective associated binary tree node, thereby creating a map between the parse tree data structure and the binary tree data structure. A request to manipulate the parse tree data structure that includes an insert request for a new DOM node is received. Concomitant to receiving the request to manipulate the parse tree data structure, an indication of a parse tree insert location for the new DOM node to be inserted is received. In response to receiving the indication of the parse tree insert location the method: inserts the new DOM node at the indicated parse tree insert location; creates a corresponding binary tree node; associates the corresponding binary tree node with the new DOM node; identifies a binary tree insertion point location for the corresponding binary tree node associated with the new DOM node; and inserts the corresponding binary tree node into the binary tree at the identified binary tree insertion point location. A document order comparison request to determine an earlier of a first given DOM node and a second given DOM node is received. In response to receiving the comparison request, the method: obtains a first corresponding binary tree node associated by the projection with the first given DOM node and a second corresponding binary tree node associated by the projection with the second given DOM node; determines which of the first corresponding binary tree node and the second corresponding binary tree node is earlier in a traversal order of the binary tree; selects a DOM node associated with the determined earlier corresponding binary tree node as the earlier DOM node; and returns an indication of the selected earlier DOM node as the earlier of the first given DOM node and the second given DOM node.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

For a more complete understanding of this disclosure, reference is now made to the following brief description, taken in conjunction with the accompanying drawings and detailed description, wherein like reference numerals represent like parts.

DETAILED DESCRIPTION

Figure 1:
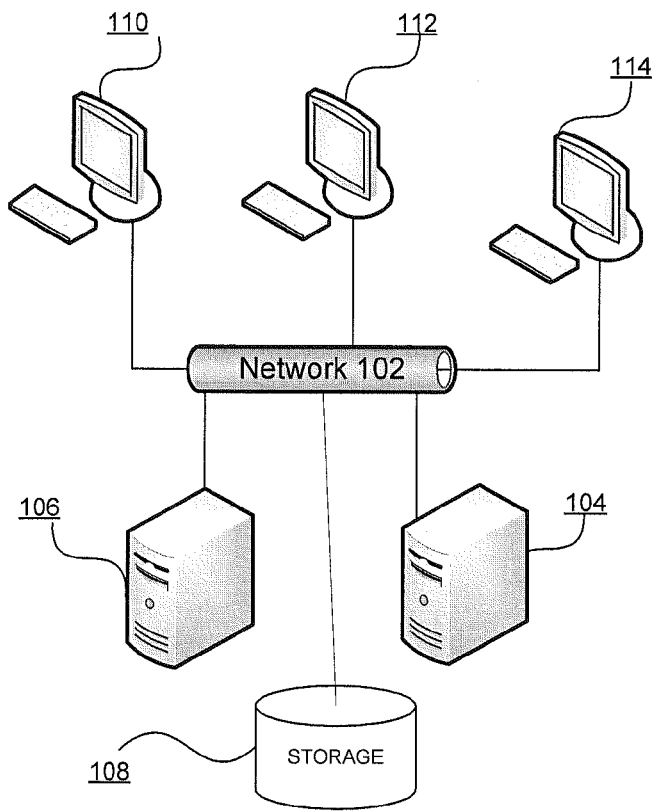
FIG. 1 is a block diagram of an exemplary network data processing system operable for various embodiments of the disclosure.

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable storage medium(s) having computer readable program code embodied thereon.

Any combination of one or more computer-readable data storage devices may be utilized. A computer-readable data storage device may be, for example, but not limited to, an electronic, magnetic, optical, or semiconductor system, apparatus, or device, or any suitable combination of the foregoing, but does not encompass propagation media. More specific examples (a non-exhaustive list) of the computer-readable data storage devices would include the following: a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device or any suitable combination of the foregoing, but does not encompass propagation media. In the context of this document, a computer-readable data storage device may be any tangible device that can store a program for use by or in connection with an instruction execution system, apparatus, or device.

Computer program code for carrying out operations for aspects of the present disclosure may be written in any combination of one or more programming languages, including an object oriented programming language such as Java®, Smalltalk, C++, or the like and conventional procedural programming languages, such as the "C" programming language or similar programming languages. Java and all Java-based trademarks and logos are trademarks of Oracle Corporation, and/or its affiliates, in the United States, other countries or both. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus, (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable data storage device that can direct a computer or other programmable data processing apparatus to function in a particular manner, such that the instructions stored in the computer readable data storage device produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide processes for implementing the functions/acts specified in the flowchart and/or block diagram block or blocks.

Figure 2:
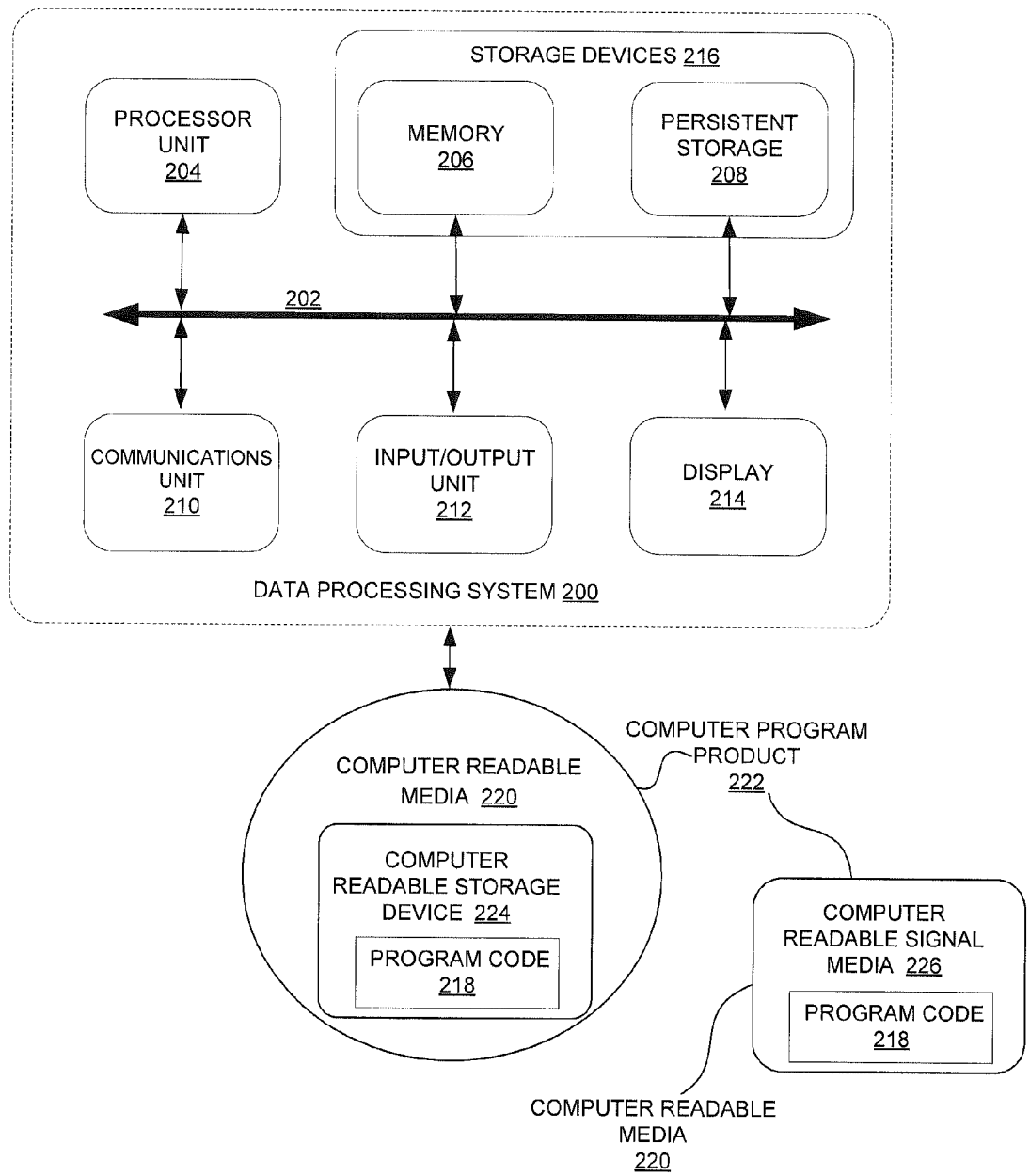
FIG. 2 is a block diagram of an exemplary data processing system operable for various embodiments of the disclosure.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments of a method for manipulating parse tree data and efficiently performing node order comparisons within the parse tree may be implemented. Network data processing system 100 is an example of a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown. A server such as server 104 may be directed to perform the disclosed method of manipulating parse tree data and efficiently performing node order comparisons within the parse tree by a user on a client such as client 110.

In the depicted example, network data processing system 100 is the Internet with network 102 representing a worldwide collection of networks and gateways that use the transmission control protocol/Internet protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference to FIG. 2 a block diagram of an exemplary data processing system operable for various embodiments of the disclosure is presented. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software, including instructions comprising the disclosed method of manipulating a parse tree structure and efficiently performing node order comparisons within the parse tree that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs, and the disclosed method of manipulating parse tree data and efficiently performing node order comparisons within the parse tree may be located in storage devices 216, which are in communication with processor unit 204 through communications fabric 202. In these illustrative examples the instructions are in a functional form on persistent storage 208. These instructions may be loaded into memory 206 for execution by processor unit 204. The processes of the different embodiments may be performed by processor unit 204 using computer-implemented instructions, which may be located in a memory, such as memory 206.

These instructions are referred to as program code, computer usable program code, or computer readable program code that may be read and executed by a processor in processor unit 204. The program code in the different embodiments of the disclosed method for manipulating parse tree data and efficiently performing node order comparisons within the parse tree may be embodied on different physical or tangible computer readable storage media, such as memory 206 or persistent storage 208.

Program code 218 is located in a functional form on computer readable media 220 that may be selectively removable, for example computer readable storage device 224 and may be loaded onto or transferred to data processing system 200 in the form of computer readable signal media 226 for execution by processor unit 204. Program code 218 and computer readable storage device 224 form one example of computer program product 222 and program code 218 and computer readable signal media 226 form another example in these examples. In one example, computer readable media 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 220 also may take the form of a persistent storage device, such as a hard drive, a thumb drive, or a flash memory that is connected to data processing system 200. The tangible form of computer readable media 220 is also referred to as computer recordable storage media or a computer readable data storage device. In some instances, computer readable media 220 may not be removable. Computer readable storage device 224 is an embodiment of a non-transitory computer readable media and does not encompass propagation media.

Alternatively, program code 218 may be transferred to data processing system 200 from computer readable media 220 through a communications link to communications unit 210 and/or through a connection to input/output unit 212 in the form of computer readable signal media 226. The communications link and/or the connection may be physical or wireless in the illustrative examples. Computer readable signal media 226 is an embodiment of transitory computer readable media.

In some illustrative embodiments, program code 218 may be downloaded over a network to persistent storage 208 from another device or data processing system for use within data processing system 200. For instance, program code stored in a computer readable data storage device in a server data processing system may be downloaded over a network from the server to data processing system 200. The data processing system providing program code 218 may be a server computer, a client computer, or some other device capable of storing and transmitting program code 218.

Using data processing system 200 of FIG. 2 as an example, a computer-implemented process is presented for manipulating parse tree data and efficiently performing node order comparisons within the parse tree. Processor unit 204 receives a parse tree data structure, wherein the parse tree data structure is representative of a document object model (DOM) tree data structure and projects the parse tree data structure received onto a data structure comprising a binary tree, wherein the projection stores an association between each DOM node and a respective associated binary tree node thereby creating a map between the parse tree data structure and the binary tree data structure. Processor unit 204 receives a request to manipulate the parse tree data structure, wherein the request comprises an insert new DOM node request. Concomitantly, processor unit 204 receives an indication of a parse tree insert location for the new DOM node to be inserted. In response to receiving, by processor unit 204, the indication of the parse tree insert location, processor unit 204: inserts the new DOM node at the indicated parse tree insert location; creates a corresponding binary tree node; associates the corresponding binary tree node with the new DOM node; identifies a binary tree insertion point location for the corresponding binary tree node associated with the new DOM node; and inserts the corresponding binary tree node into the binary tree at the identified binary tree insertion point location. Processor unit 204 receives a document order comparison request to determine an earlier of a first given DOM node and a second given DOM node. Responsive to receiving the document order comparison request, processor unit 204 performs a binary tree document order comparison by obtaining a first corresponding binary tree node associated by the projection with the first given DOM node and a second corresponding binary tree node associated by the projection with the second given DOM node. Processor unit 204 determines which of the first corresponding binary tree node and the second corresponding binary tree node is earlier in a traversal order of the binary tree and select a DOM node associated with a determined earlier corresponding binary tree node as the earlier DOM node. Processor unit 204 further returns an indication of the selected earlier DOM node as the earlier of the first given DOM node and the second given DOM node.

Figure 3:
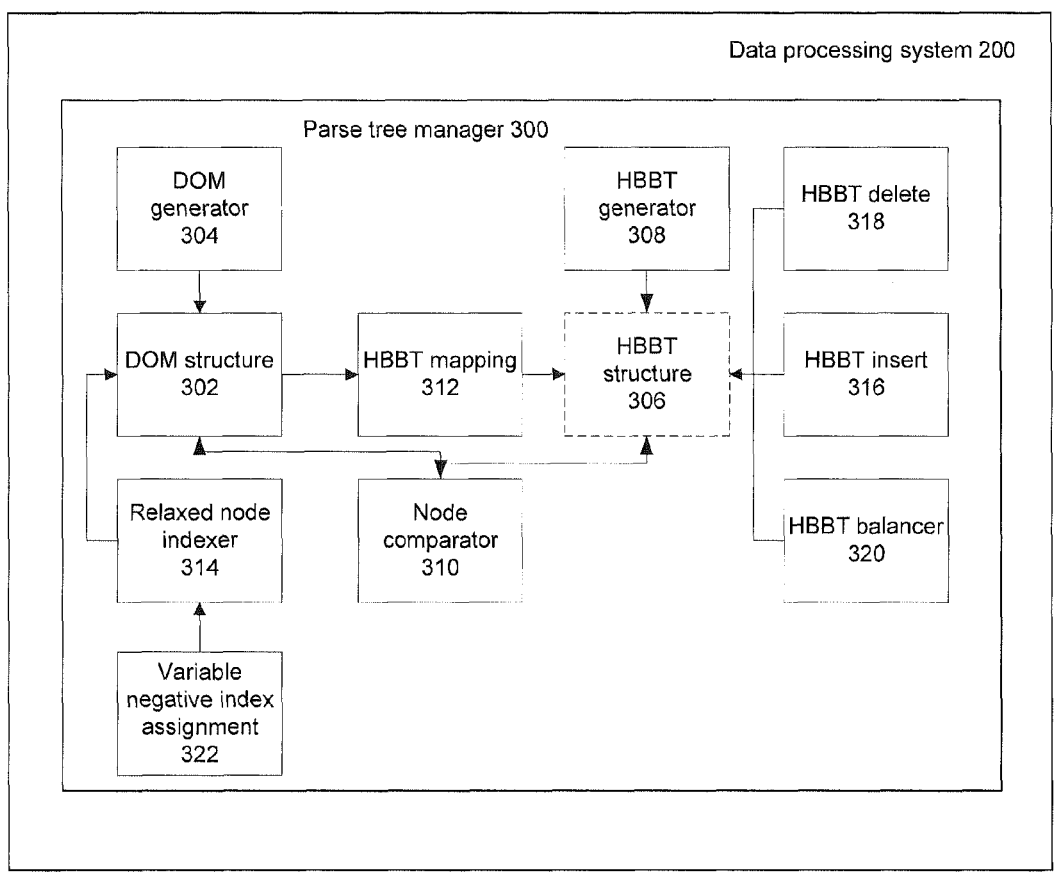
FIG. 3 is a block diagram of a parse tree manager operable for various embodiments of the disclosure.

With reference to FIG. 3 a block diagram of a parse tree manager operable for various embodiments of the disclosure is presented. Parse tree manager 300 is an example embodiment providing capabilities of manipulating parse tree data and efficiently performing node order comparisons within the parse tree as disclosed.

Parse tree manager 300 leverages the underlying support of a data processing system such as data processing system 200 of FIG. 2 to provide typical system services for the operation of components comprising the manager. Parse tree manager 300 comprises a number of interdependent components as shown in the example of FIG. 3. The example illustrated is not meant to be limiting because the components shown may be configured in various combinations of more or less components according to specifics of an implementation. Logical functions may be combined into larger elements without loss of function. In the example described, a height-balanced version of a binary tree is used however a typical binary tree may also be used in an alternative embodiment.

DOM structure 302 is created using DOM generator 304 in a conventional manner. A DOM structure is a document object model represented in a tree data structure comprising a hierarchy of related nodes created using DOM generator 304. The document order relation of the DOM nodes is such that DOM node $D_X$ is considered to be earlier in the document order than a DOM node $D_Y$ if a pre-order traversal of the DOM tree data structure would visit $D_X$ before visiting $D_Y$.

Height balanced binary tree (HBBT) structure 306 is created using HBBT generator 308. The HBBT structure is also a tree data structure, however, the HBBT has different properties compared to the DOM structure. For example, an HBBT node has at most two child HBBT nodes. HBBT structure 306 provides a capability to represent the content of DOM structure 302 in a consistent and efficient manner useful for comparing node positioning. Let N be the number of nodes in the DOM structure 302 and hence also the HBBT structure 306, and let K be any integer such that 1<=K<=N. An in-order traversal of a binary tree first traverses the sub-tree rooted by the left child of a node, then visits the node, then traverses the sub-tree rooted by the right child of a node. The HBBT structure 306 is generated by HBBT generator 308 in such a way that a DOM node visited after K steps of a pre-order traversal of DOM structure 302 has an associated HBBT node that is visited after K steps of an in-order traversal of the HBBT structure 306. The synchronization between nodes in DOM structure 302 and corresponding nodes in HBBT structure 306 is managed using HBBT mapping 312. Further, the integrity and efficiency of HBBT structure 306 is maintained using HBBT balancer 320 to ensure the tree structure is compact and appropriately balanced.

When a node is inserted into DOM structure 302, a corresponding node is also inserted into HBBT structure 306 to maintain a structural affinity between the two data structures. Similarly, when a node is deleted from DOM structure 302, the associated HBBT node is deleted from HBBT structure 306. The HBBT structure 306 is balanced after a node insertion or deletion in order to maintain the property that the path between any two HBBT nodes has O(log N) length. Thus, as insert and delete operations are processed, parse tree manager 300 maintains a correspondence between DOM structure 302 and HBBT structure 306 to ensure that the successive DOM nodes in the pre-order traversal order in DOM structure 302 have corresponding HBBT nodes that match the in-order traversal order of HBBT structure 306.

Using an embodiment of the disclosed method, when a DOM node is inserted into DOM structure 302, a representative HBBT node is also created, associated with the inserted DOM node in HBBT mapping 312, and inserted into HBBT structure 306 using a specialized method of HBBT insert 316. The HBBT insert 316 receives the HBBT node corresponding to either the predecessor DOM node or the successor DOM node of the DOM node newly inserted into DOM structure 302. The received HBBT node will be the predecessor or successor node of the new HBBT node being inserted, and the HBBT insert 316 performs conventional tree navigation operations relative to the received HBBT node in order to identify the insertion location for the new HBBT node being inserted without using or requiring key comparisons among nodes in HBBT structure 306. Once HBBT insert 316 inserts the new HBBT node at the insertion location, the HBBT insert 316 performs the structural height balancing operation on HBBT structure 306. In a similar fashion, when a DOM node is deleted from DOM structure 302, the specialized operation HBBT delete 318 deletes the corresponding HBBT node from the HBBT structure 306 and then performs the structural height balancing operation on HBBT structure 306. The total cost of HBBT insert 316 is worst case O(log N). Obtaining the predecessor or successor DOM node of the DOM node being inserted is expected to take O(log N) time with a low constant factor due to the expected high branching factor of the DOM tree structure. The total cost of HBBT insert 316 is worst case O(log N).

The structure of HBBT structure 306 is exploited to provide an efficient comparator for DOM nodes. When two DOM nodes $D_X$ and $D_Y$ must be compared, Node comparator 310 first obtains their corresponding HBBT nodes from HBBT mapping 312, denoted X and Y, and then it performs within HBBT structure 306 a closest ancestor comparison method similar to the DOM tree traversal method to determine the earlier of X and Y in the in-order traversal order of HBBT structure 306. Specifically, the closest common ancestor of X and Y, denoted $H_A$, is obtained. If X is in the left sub-tree of $H_A$ or is equal to $H_A$, then X is earlier than Y, and otherwise Y is earlier than X because Y is in the left sub-tree of $H_A$ or is equal to $H_A$. Node comparator 310 provides the relative order result of X and Y in the HBBT structure 306 as the document order result for $D_X$ and $D_Y$ in the pre-order traversal order of DOM structure 302. Since the HBBT is a height balanced binary tree, the HBBT ancestor comparison method requires O(log N) time in the worst case, which is favorable to the worst case O(N) performance of the DOM tree traversal comparison method. Moreover, the disclosed method provides simultaneously efficient insert, delete and node comparison operations for DOM structure 302.

Although Java collections and C++ standard template libraries (STL) maps are also backed using data structures of height balanced binary trees, the two types of mappings are designed for use only with comparable objects. For example, an insertion operation for a new object (using either mapping) implicitly performs comparisons with similar objects already in the tree to locate a proper insertion point, and then the new object is placed in the tree and a structural height balancing is performed. Using an embodiment of the disclosed method, new objects are not comparable until after the objects are placed into the tree (rather than before as in the previous two types of mapping) because only after corresponding HBBT nodes are inserted is it the case that the structure of HBBT structure 306 is used to make DOM nodes of DOM structure 302 comparable to one another.

In one embodiment, HBBT structure 306 is simply a binary tree data structure rather than a height balanced binary tree data structure. The difference between the two data structures is that height balancing manipulations are performed after insert and delete operations only on a height balanced binary tree data structure. In the average case, a binary tree data structure also has O(log N) height, though its height may degrade to O(N) on some workloads. The binary tree data structure embodiment further illustrates the disclosed method is not reliant upon height balancing operations such as may be included in the map data structures of Java collections and C++ standard template libraries. Rather, height balancing is an additional feature that is also used in compliment with the disclosed method to help ensure logarithmic binary tree height in a worse case, thereby guaranteeing worst case logarithmic performance of the binary tree structure navigation used in a node comparison operation. Without height balancing, the node comparison operation still has an advantage of logarithmic performance in an average case, although performance may degrade to linear performance for some workloads. Meanwhile, insert and delete operations would typically be faster than when using a binary tree data structure, relative to using a height balanced binary tree structure.

Relaxed node indexer 314 provides a capability of a conventional node indexing mechanism with additional features. The additional features enable the total ordering imposed on node index values to be relaxed. A DOM node indexing method typically operates in an array like manner to map DOM nodes to integers, (index values) and therefore inherits the inefficiency of array insertion. Relaxed node indexer 314 enables a more efficient solution through relaxed ordering. During the relaxed node index operation, existing DOM nodes are assigned a depth first index value (DFI), and any subsequently inserted new DOM node is assigned an index value that is distinguishable from a DFI and which may make the node comparable to many other DOM nodes. Thus, DOM nodes are still compared, using node comparator 310, by respective index values, except when the comparison yields an inconclusive result, which depends on a negative index assignment technique, such as the technique provided by variable negative index assignment 322.

The index comparison of two DOM nodes is deemed to be inconclusive when the index values of the respective DOM nodes of DOM structure 302 are equal. A secondary comparison technique is therefore required to resolve the inconclusive outcome. In one example of a secondary comparison technique, the conventional DOM tree traversal comparison method may be used, enabling the relaxed node index method to have value independently of the previously described HBBT mapping 312. However, HBBT mapping 312 described previously can also be used as a secondary comparison technique.

In another illustrative embodiment, when relaxed node indexer 314 is used with variable negative index assignment 322 and with HBBT mapping 312 as the secondary comparison technique, then HBBT mapping 312 and the HBBT insert 316 and HBBT delete 318 operations can be further refined in such a way that HBBT structure 306 need only store newly inserted nodes, rather than all DOM nodes of DOM structure 302. Specifically, for each newly inserted DOM node, HBBT mapping 312 is amended to also store the absolute value of a negative index of the DOM node as a key value for the corresponding HBBT node. This allows the further refined HBBT insert 316 to find the insertion location for a new HBBT node even when the associated predecessor and successor DOM nodes of the DOM node have a non-negative index assignment and therefore no associated HBBT node.

Instead, under this illustrative embodiment, the insertion location is determined by performing a specialized binary tree search of HBBT structure 306 using the non-negative index value of the predecessor DOM node, denoted P, as the search key. Specifically, when an HBBT node is found whose key equals index of P, then the earliest such HBBT node in in-order traversal order is obtained, and a respective predecessor insertion location is used as the binary tree insertion location for the new HBBT node. Otherwise, the last binary tree node visited by the binary tree search is obtained and a respective binary tree predecessor or successor insertion location is selected as the binary tree insertion location for the new HBBT node based on whether the index of P is less or greater, respectively, than the key of the last binary tree node visited.

Under this illustrative embodiment, after the new HBBT node is inserted and HBBT structure 306 has been re-balanced by HBBT balancer 320, then HBBT mapping 312 is updated with the absolute value of the new DOM node associated with the new HBBT node. The further refined HBBT delete 318 is responsive to the non-existence of an associated HBBT node in HBBT mapping 312 for a DOM node being deleted, which occurs when the DOM node being deleted was included in the last index assignment operation and therefore has a non-negative index. In this case, the DOM node is simply deleted and HBBT delete 318 performs no change upon HBBT structure 306 since there is no HBBT node to delete. Node Comparator 310 requires no modification because it is only invoked as a secondary comparison when two DOM nodes have an equal and negative index value. In this case, both DOM nodes have associated HBBT nodes, and the relative order of HBBT nodes in an in-order traversal of HBBT structure 306 matches the order in which their associated DOM nodes are encountered in a depth first preorder traversal of DOM structure 302. In this alternative embodiment, the size and height of HBBT structure 306 is thus more compact than in an implementation accommodating all DOM nodes.

In another illustrative embodiment, the tree of DOM structure 302 is re-indexed, and HBBT structure 306 is returned to an empty state when HBBT structure 306 exists, because the re-indexing operation can be exploited for greater efficiency, for example, at certain well-defined events in the processing model of a scripting language such as XForms, which uses XML and XPath (XForms is an XML format for the specification of a data processing model for XML data and user interface(s) for the XML data). In another illustrative embodiment, a language processor, such as for XForms, is used to determine when to automatically perform a re-index operation based on a structural change detector, such as a rebuild flag or a specialized flag indicating the insertion of nodes since a last indexing operation was performed. The flag may be set using a predetermined number of insertions, including when a single insertion occurs. In another illustrative embodiment, the ability of the structural change detector to flag only the insertion of non-text nodes is used, thereby avoiding costly re-index operations when a text node insertion is used to change a value from an empty string to a non-empty value, which may be regarded as an informational mutation, and not a structural manipulation of the parse tree data structure.

Using an embodiment of relaxed node indexer 314, two DOM nodes, node $D_X$ and node $D_Y$, are usually comparable in O(1) time despite DOM insertions or deletions of DOM structure 302, however performance may degrade in a special case when index comparison of node $D_X$ and node $D_Y$ is inconclusive, for example due to being equal and negative. When a secondary comparison is performed using the DOM tree traversal comparison method, the performance may degrade to O(n), but insertion and deletion are usually O(1) with variable negative index assignment 322, though technically the worst case is based on the DOM tree depth. When a secondary comparison uses a refined HBBT mapping 312, the performance of comparison typically only degrades to O(log n) in the special case, and the insert and delete operations typically only degrade in order of magnitude to an expected logarithmic time.

Note that n is not the number of nodes N in the tree of DOM structure 302 but rather the number of nodes inserted into the tree of DOM structure 302 and HBBT structure 306 since the DFI values were generated. For an empirical perspective of a typical improvement in processing, consider a DOM mutation script that expresses a variant of the quicksort and uses XPaths to indicate the nodes being sorted. By using the HBBT structure 306 to help the XPaths efficiently determine document order despite the quicksort mutations of the DOM structure 302, the performance typically improves from $O(n^2)$ to expected $O(n \log^2 n)$, where n is the number of nodes being sorted. For example, when n=1000 elements, an improvement in processing typically corresponds to a 10-fold performance increase for that DOM mutation script.

The disclosed method can also automatically benefit applications consuming a mutable data parse tree and a tree addressing mechanism imposing a document order on the addressed nodes. For example, forms applications using XForms could benefit from improving an XPath engine in a Java or C++ XForms processor. More generally, a Java servlet, business analytic or big data operator, or web service code that marshals data to and from an XML format could benefit from an improvement of the XPath engine used in node selections, particularly when structural mutations are required to marshal the data. For example, when a data model is based not on XForms but rather on a server side relational database, servlet code is used to map from the relational database content into a web service call, and the servlet code could be automatically optimized using the disclosed method, resulting in faster XML web service calls, particularly when the web service call returns an indeterminate number of result structures from database query.

A commonly occurring component of manipulating parse tree data is an operation of obtaining a predecessor DOM node or a successor DOM node for a new DOM node being inserted into a DOM node of a structure such as DOM structure 302 of FIG. 3. The operation is not simply a matter of obtaining a preceding or succeeding sibling of a new DOM node. Rather, the predecessor and successor DOM nodes are nodes that would receive an immediate lesser, or an immediate greater, DFI value when a depth first search is performed immediately after inserting a new DOM node. Specifically, when the tree of DOM structure 302 of FIG. 3 is to be re-indexed and the new DOM node is to receive a DFI of K+1, then the predecessor DOM node would have a DFI of K, and the successor DOM node, when one exists, would have a DFI of K+2.

A new DOM node being inserted into DOM structure 302 of FIG. 3 always has a parent. When the new DOM node is inserted as a first child of the parent, then the parent is the predecessor DOM node and is located at O(l) cost. When the new DOM node has a succeeding sibling under the same parent, then the succeeding sibling is the successor DOM node and is located at O(l) cost. Otherwise, the new DOM node is being appended to a child list of a respective parent, and has a preceding sibling. The rightmost descendant in the sub-tree of a preceding sibling is the predecessor DOM node. In this case, obtaining a DOM successor node is also possible, when one exists, by obtaining the next sibling node of the nearest ancestor node that has a next sibling node, but the predecessor DOM node is typically less costly to obtain in this case due to the high branching factor of DOM trees. In typical scenarios, obtaining the DOM predecessor from the previous sibling node will typically incur O(l) cost and is not expected to exceed O(log N) cost in practice due to the normally high branching factor in DOM trees.

HBBT mapping 312 of FIG. 3 can be implemented using a red-black tree structure, wherein the self-balancing is provided by painting each node with one of two colors (these are typically called 'red' and 'black', hence the name of the trees) in such a way that the resulting painted tree satisfies certain properties that do not allow the tree to become significantly unbalanced. When the tree is modified, the new tree is subsequently rearranged and repainted to restore the coloring properties. The properties are designed in such a way to enable rearranging and recoloring efficiently. Thus, the HBBT nodes have typical pointer or index indicators for parent, left child, right child and color (one of red or black). Using this baseline version, there is no key for the DOM nodes associated with the HBBT nodes, so the HBBT nodes do not need to have any other members.

HBBT mapping 312 of FIG. 3 exploits height balancing operations of a red-black tree that are not based on key comparison, rather only on tree structure components listed previously as members of the HBBT nodes. In a typical red-black tree application, key comparisons are performed to find an insertion point or a node to delete, the insertion or deletion is performed, then the height balancing operation occurs without the aid of any further key comparison. HBBT mapping 312 of FIG. 3 combines the height balancing aspect of the red-black tree with specialized insert and delete operations that also avoid key comparisons.

Each DOM node in DOM structure 302 of FIG. 3 receives a pointer or index indicator for storing a respective representative HBBT node of HBBT structure 306 of FIG. 3, thereby creating a mapping between the tree structure of DOM structure 302 and the tree structure of HBBT structure 306 of FIG. 3.

Figure 4:
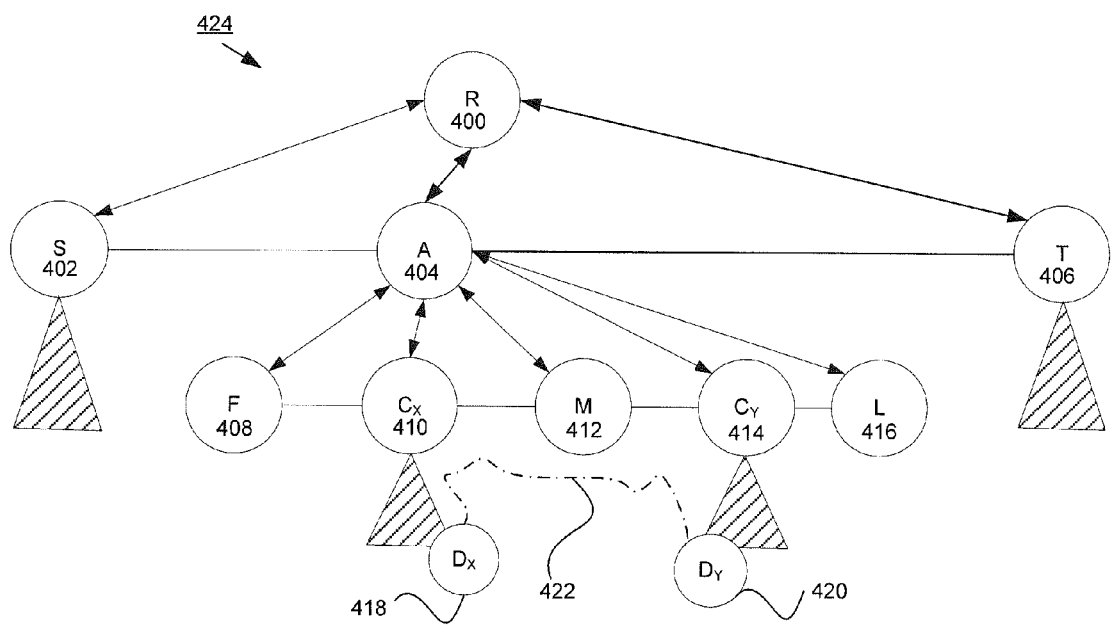
FIG. 4 is a block diagram of a document object model parse tree in accordance with an embodiment of the disclosure.

With reference to FIG. 4 a block diagram of a document object model parse tree operable for various embodiments of the disclosure is presented. Parse tree 424 is an example of DOM structure 302 of FIG. 3. Using the example parse tree 424 the DOM tree is rooted by node R 400, and DOM nodes comprising node S 402, node A 404, and node T 406 are among the DOM children of node R 400. In one technique of storing DOM trees, each DOM node has pointers or indicators to a respective parent, first child, last child, and previous and next sibling. The child list of a DOM node is traversed beginning at the DOM node and traversing to a first child, then continuing along next sibling pointers of each child until the DOM node of a last child is reached. For example, node A 404 has a child list that starts with node F 408, and then includes node $C_X$ 410, node M 412, node $C_Y$ 414, and ending with node L 416.

In the example of the DOM tree of parse tree 424, horizontal lines illustrate sibling connections, (such as those from node S 402 to node A 404 and node T 406) and diagonal lines (such as those linking child nodes of node $C_X$ 410, node M 412, node $C_Y$ 414, and node L 416 with parent node A 404) indicate bi-directional parent-child connections. The curvy dashed representation of line 422 represents the main work performed by the DOM tree traversal comparison method to determine a relative document order of two DOM nodes $D_X$ 418 and $D_Y$ 420.

Figure 5:
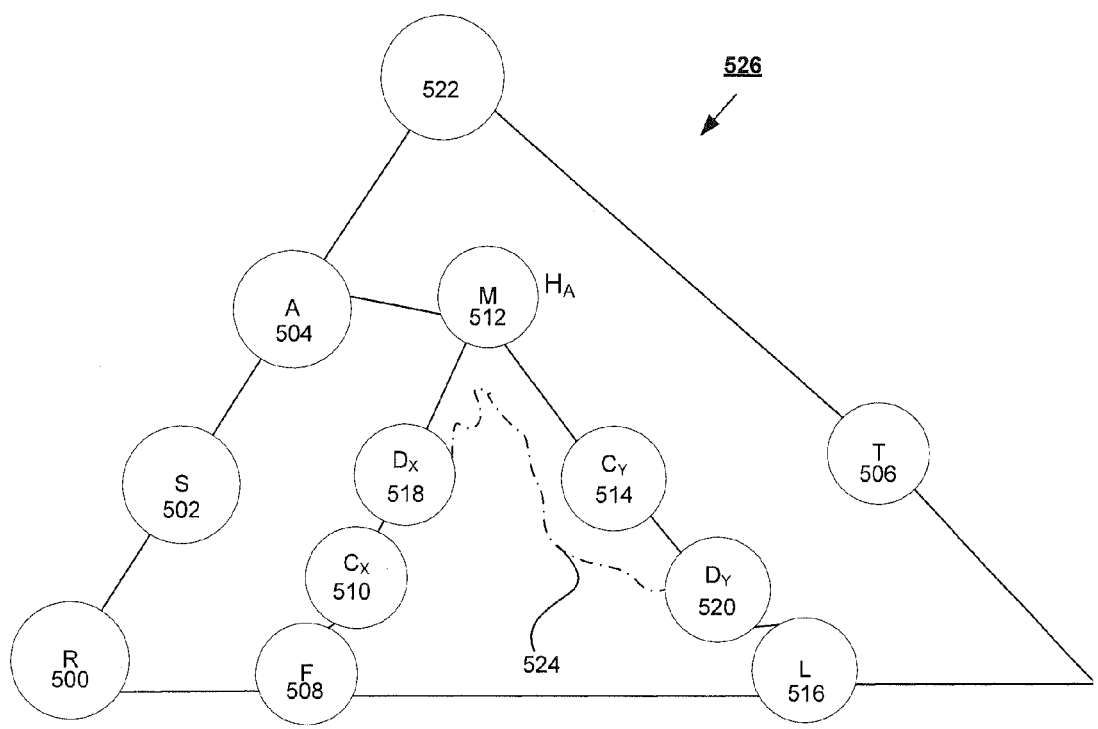
FIG. 5 is a block diagram of a height balanced binary tree representative of the document object model parse tree of FIG. 4, in accordance with an embodiment of the disclosure.

With reference to FIG. 5, a block diagram of a height balanced binary tree operable for various embodiments of the disclosure is presented. HBBT 524 is an example of HBBT structure 306 of FIG. 3 corresponding to DOM tree structure of parse tree 424 of FIG. 4.

HBBT 526 depicts how various DOM nodes of parse tree 424 of FIG. 4 would be mapped into a height-balanced tree structure. For example, DOM root R 400 is associated with a leftmost HBBT node 500 because node R 400 of FIG. 4 is first in the document order of the DOM of parse tree 424. Similarly, node S 402 is before node A 404 in the DOM represented by parse tree 424 of FIG. 4, and a respective representative HBBT node S 502 is in the left HBBT sub-tree of the HBBT node A 504 associated with node A 404 of FIG. 4. Descendants of node A 404 of FIG. 4 are located later in the document order of the DOM, and are therefore also located in the right HBBT sub-tree of the HBBT node associated with node A 504, including HBBT node F 508, node $C_X$ 510, $D_X$ 518, node M 512, $C_Y$ 514, node $D_Y$ 520, and, node L 516. Siblings of node A 404 in the DOM of FIG. 4 are located logically later in the HBBT 526, as depicted by an appearance as an ancestor of node A 504 and a right sub-tree, which includes the HBBT node T 506 associated with node T 406 of FIG. 4. Node M 512 is also referred to as $H_A$ because it is the closest common ancestor of child node $C_X$ and child node $C_Y$ in HBBT 526.

Although the DOM document order is based on a pre-order interpretation of the DOM structure of parse tree 424 of FIG. 4, the HBBT 526 provides the DOM document order based on an in-order traversal of the HBBT 526. The curvy dashed representation of line 524 represents the main work performed by the HBBT comparison method to determine a relative order of HBBT node $D_X$ 518 and node $D_Y$ 520.

When not combined with the disclosed relaxed node index method, every DOM node will have an associated HBBT node. Initial definitions of the HBBT operations make this assumption. However the HBBT operations are further refined in alternative embodiments to accommodate DOM nodes that do not have associated HBBT nodes.

In an HBBT insert operation, for example HBBT insert 316 of FIG. 3, when a new DOM node is inserted, a new HBBT node associated with that DOM node is also inserted into the HBBT data structure. The HBBT specialized insert operation begins by obtaining either a predecessor or a successor DOM node of the newly inserted DOM node. Rather than using a key to find the insertion point in the HBBT data structure, the HBBT node of the DOM predecessor or successor is obtained. Using a structural tree successor or predecessor operation, respectively, the insertion point for the new HBBT node associated with the new DOM node is obtained.

Specifically, when the DOM predecessor is provided, a corresponding HBBT node P is obtained, (P for predecessor) and then the successor insertion point is identified as the right member of P, denoted P.right, when it is nil, or identified as the left member of the leftmost node in the P.right sub-tree when P.right is not nil. Symmetrically, when the DOM successor is provided, a corresponding HBBT node S is obtained, (S for successor) and the predecessor insertion point is identified as S.left when nil, or identified as the right member of the rightmost node in the S.left sub-tree when not nil. The new HBBT node associated with the new DOM node is then inserted at the identified insertion point, and the red-black tree height balancing operation is performed.

In an HBBT delete operation, for each DOM node deletion, the DOM node to delete is inherently known as part of a particular deletion. Rather than using a key to find the deletion point in the HBBT, the HBBT node corresponding to the DOM node being deleted is obtained, and that specific HBBT node is deleted. Conventional red-black tree height balancing operation is performed afterward.

In an example operation, using HBBT-based node comparison, given two DOM nodes, node $D_X$ and node $D_Y$, respective associated HBBT nodes, node X and node Y are obtained. The parent links of node X and node Y are traversed to find a closest common ancestor node $H_A$ of node X and node Y, which has guaranteed logarithmic cost due to the height balancing of the HBBT data structure. When node X equals node $H_A$, then node $D_X$<node $D_Y$ when node Y is in the right sub-tree and node $D_Y$<node $D_X$ when node Y is in the left sub-tree. Similarly, when node Y equals node $H_A$, then node $D_Y$<node $D_X$ when node X is in the right sub-tree and node $D_X$<node $D_Y$ when node X is in the left sub-tree. Otherwise, node $H_A$ is distinct from node X and node Y, so obtain the children nodes, labeled 518 and 514 in FIG. 5 and labeled $C_X$ 602 and $C_Y$ 604 in FIG. 6, of node $H_A$ that are the roots of the HBBT sub-trees containing, respectively, node X and node Y. When the subtree root containing X is the left child of node $H_A$, then node $D_X$<node $D_Y$, and otherwise node $D_Y$<node $D_X$ because the subtree root containing Y is the left child of node $H_A$ (note that the root of the subtree containing X is distinct from the root of the subtree containing Y in this case because node $H_A$ is the closest common ancestor of node X and node Y).

Figure 6:
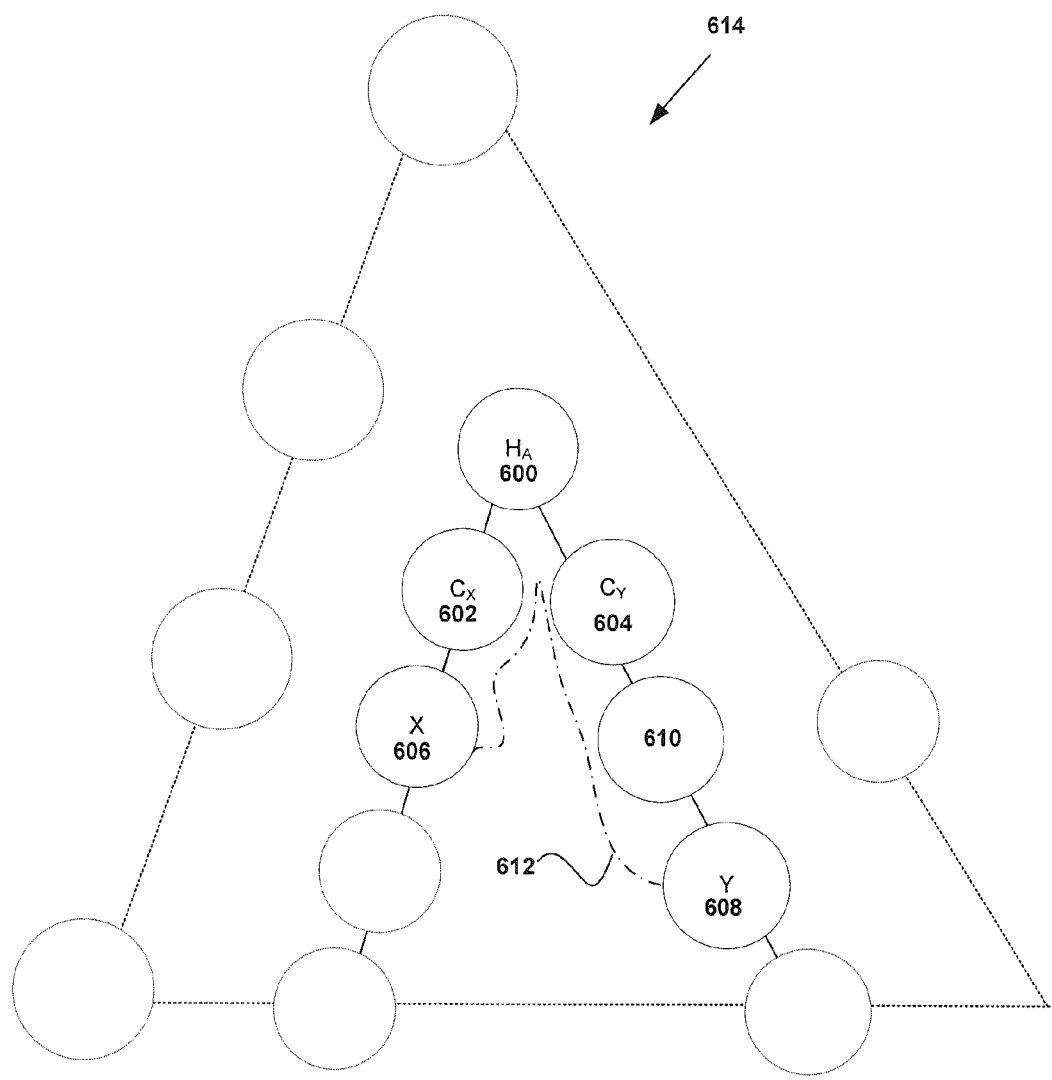
FIG. 6 is a block diagram of a height balanced binary tree representative of a portion of the height balanced binary parse tree of FIG. 5, in accordance with an embodiment of the disclosure.

With reference to FIG. 6 a block diagram of a height balanced binary tree operable for various embodiments of the disclosure is presented. HBBT 614 is an example of a portion of HBBT structure 526 of FIG. 5.

A portion of HBBT 526 from FIG. 5 has been relabeled, according to the previous description, to illustrate similarity between the DOM tree traversal method and the tree traversal method applied in the HBBT data structure. The differences are, in HBBT 612, node $H_A$ 600 has only two children node $C_X$ 602 and node $C_Y$ 604, and the paths between node X 606 and node $C_X$ 602 and between node Y 608 to node $C_Y$ 604 have logarithmic length.

To implement an embodiment of the relaxed node index method, begin with a depth first search to assign DFI values ranging from 0 to N−1 to the DOM nodes, where N is the number of DOM nodes. Each DOM node inserted after performing the depth first search is assigned a negative index value. The index values of DOM nodes are however not changed in response to a DOM node delete because deleting a node does not affect the comparability of the indexes of remaining DOM nodes. During a node comparison, the primary comparison technique is based on the index values of the two nodes being compared. When node $D_X$ and node $D_Y$ both have non-negative index values, then both have valid DFI values that continue to establish a respective relation, in document order, because neither the insertion nor deletion of other nodes can affect the relative order of $D_X$ and $D_Y$ in the DOM data structure.

Accordingly, when $D_X$ and $D_Y$ have non-negative index values, then $D_X$<$D_Y$ when DFI($D_X$)<DFI($D_Y$), and $D_Y$<$D_X$ when DFI($D_Y$)<DFI($D_X$). When either or both of $D_X$ and $D_Y$ have a negative index value, then the comparison of $D_X$ and $D_Y$ by index value is inconclusive without further refinement or use of a secondary comparison technique.

In an alternate embodiment, variable negative index assignment is a refinement of the previously described negative index assignment method that makes many newly inserted nodes and pre-existing nodes directly comparable to one another without having to resort to a secondary comparison technique. For example, when a node is newly inserted, a negative index value is assigned, calculated using an index value of a respective predecessor DOM node or successor DOM node. Whether a predecessor DOM node or successor DOM node is given, when either has a negative index value, then assign that negative index value to the new DOM node. When a predecessor DOM node is given with a non-negative index value K, then assign −K−1 as the index value of the new DOM node. Similarly, when a successor DOM node is given with a non-negative index value of K+1, then assign −K−1 as the index value of the new DOM node.

Now, when one of node $D_X$ and node $D_Y$ has a negative index value and the other has a non-negative index value, the two nodes are comparable by index. Without loss of generality, let node $D_X$ be the DOM node with a negative index equal to −K−1; then node $D_X$<node $D_Y$ when K<DFI($D_Y$), and node $D_Y$<node $D_X$ otherwise. The case in which node $D_X$ has a non-negative index and node $D_Y$ has a negative index is symmetric. Finally, in the case in which node $D_X$ has a negative index −$K_X$−1 and node $D_Y$ has a negative index −$K_Y$−1, then nodes $D_X$ and $D_Y$ are comparable by index unless $K_X$=$K_Y$. Specifically, node $D_X$<node $D_Y$ when $K_X$<$K_Y$, and node $D_Y$<node $D_X$ when $K_Y$<$K_X$, and a secondary comparison technique is needed when $K_X$=$K_Y$. Note that when $K_X$=$K_Y$, then DOM node $D_X$ and node $D_Y$ must have been newly inserted after the last time a depth first search assigned DFI values to DOM nodes that existed before node $D_X$ and node $D_Y$, and both node $D_X$ and node $D_Y$ must have been inserted after the DOM nodes with DFIs of $K_X$ and $K_X$+1, except when $K_X$ is the highest assigned DFI value. As in the previous examples, curvy dashed line 612 represents the work performed by the HBBT comparison method as the secondary comparison method.

In one embodiment, the index values assigned with the variable negative index assignment can be compared by an alternative implementation. For example, the lesser of nodes $D_X$ and $D_Y$ can be selected by performing the following sequence. First, select $D_X$ when the absolute value of the index of $D_X$ is less than the absolute value of the index of $D_Y$. Otherwise, select $D_X$ when the index of $D_X$ is negative and the absolute value of the index of $D_X$ equals the absolute value of the index of $D_Y$. Otherwise, select $D_Y$.

Figure 7:
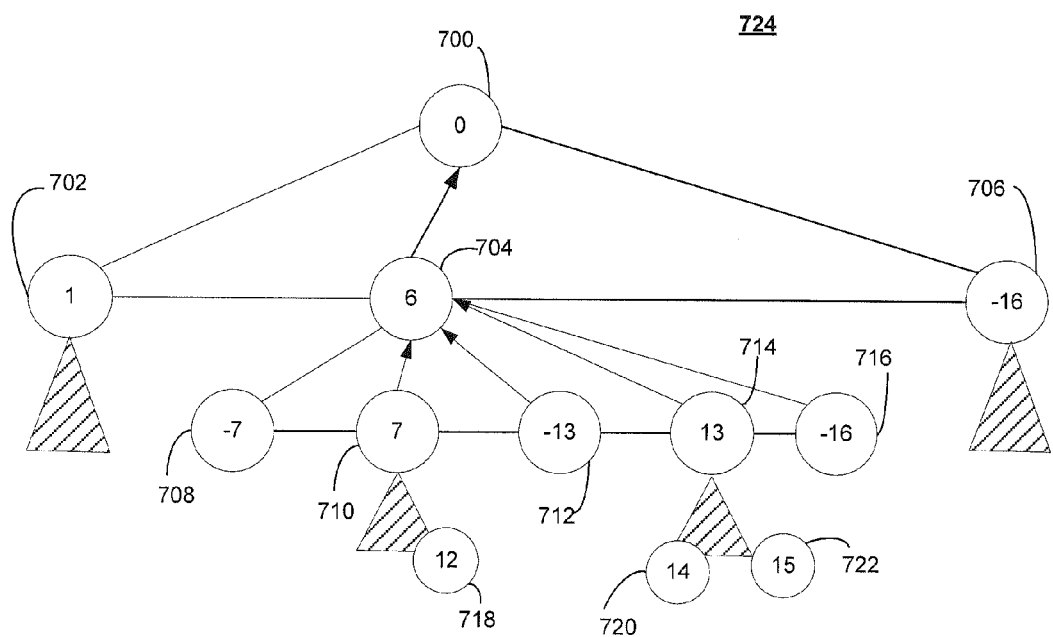
FIG. 7 is a block diagram of a DOM tree using variable negative indexing operable in accordance with an embodiment of the disclosure.

With reference to FIG. 7 a block diagram of a DOM tree using variable negative indexing operable for various embodiments of the disclosure is presented. DOM tree 724 is an example of a portion of parse tree 424 of FIG. 4.

DOM tree 724 contains several non-negative index values assigned by a preceding depth first search index operation, as in root node 700, node 702, node 704, node 710, node 714, node 718, node 720 and node 722. DOM insertion of the nodes with the negative index values is examined in order from left to right. DOM node 708 is labeled −7 because a predecessor DOM node is labeled 6, and a variable negative indexing calculation expression of −6−1=−7. DOM node 712 labeled −13 is inserted with a successor node 714 that has a label value of 13, so in this instance K=12, and the variable negative indexing calculation yields −12−1=−13. The left node 716 labeled −16 is inserted as a last node of a respective parent node 704 having a value of 6, so a predecessor node is a rightmost descendant node 722 with a label of 15 of the preceding sibling node 714 with a label of 13, and the variable negative indexing calculation yields −15−1=−16. The rightmost node 706 labeled −16 is also inserted as the last node of a respective parent node 700 labeled 0, so a respective preceding sibling node 704 with a value of 6 is obtained, and a respective rightmost descendant is labeled −16, so the new node also receives this index value so that the new node joins the set of newly inserted nodes immediately after node 722 with label 15 in document order (pre-order traversal order).

As an example, nodes 418 and 420 in FIG. 4, which are labeled $D_x$ and $D_y$, correspond to nodes 718 and 720 in FIG. 7, and they are directly comparable by the index values shown in FIG. 7. In an alternative index assignment, if all nodes in the subtree rooted by node 704 were newly inserted DOM nodes, then nodes 704 through 722 would all have the same assigned distinguishable index value, in which case a secondary comparison method would be required to determine the relative order of the nodes 718 and 720.

Figure 8:
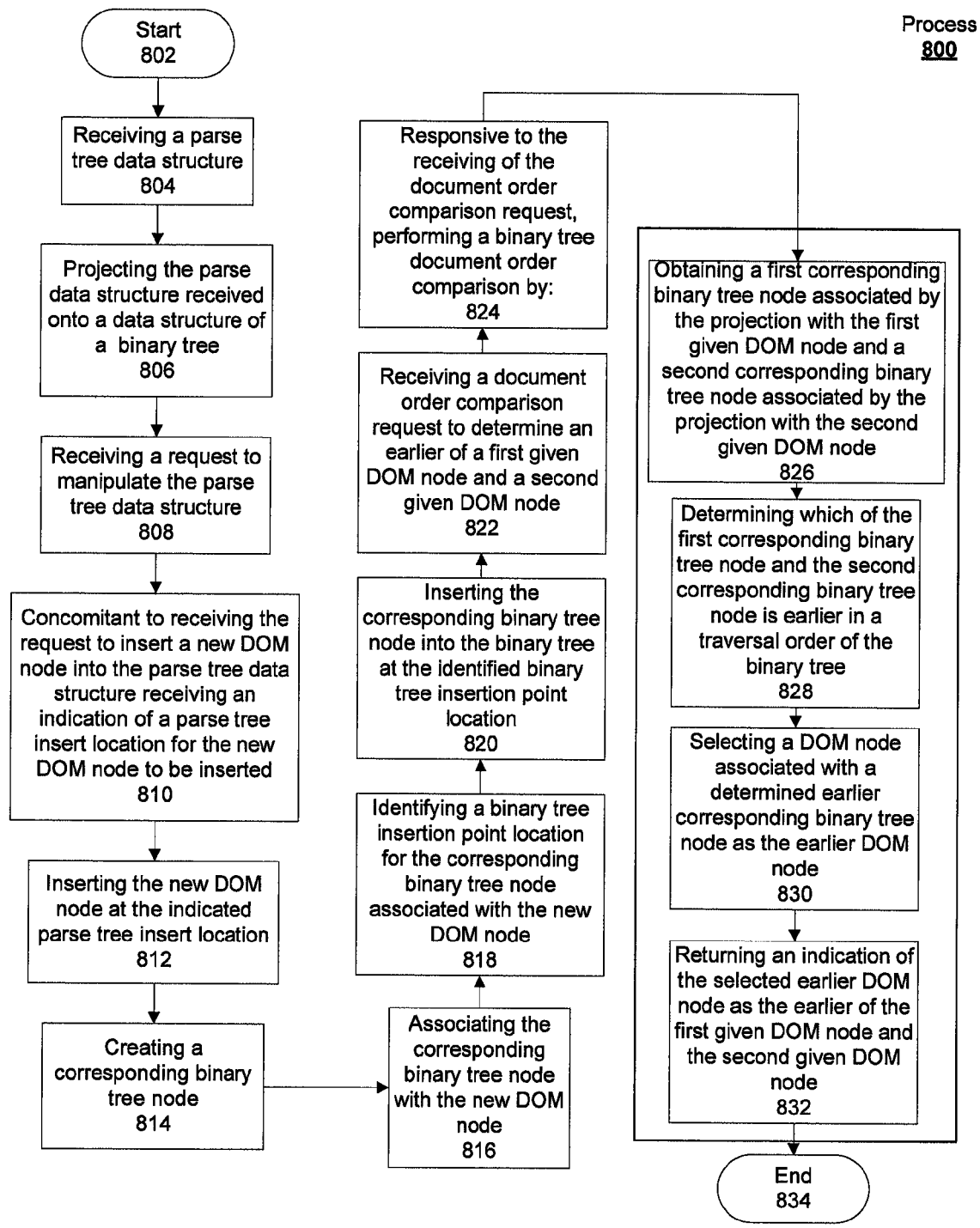
FIG. 8 is a flowchart of manipulating parse tree data using the parse tree manager of FIG. 3 for various embodiments of the disclosure.

With reference to FIG. 8 a flowchart of manipulating parse tree data and efficiently performing node order comparisons within the parse tree using the parse tree manager of FIG. 3 for various embodiments of the disclosure is presented. Process 800 is an example of an embodiment of the parse tree manager 300 of FIG. 3.

Process 800 begins (block 802) and receives a parse tree data structure (block 804). The parse tree data structure, in one embodiment, is representative of a document object model (DOM) tree data structure. A depth first search can be used to create a node index for the DOM tree data structure, such as when the relaxed node index method is also being used along with binary tree projection In response, the parse tree data structure received is projected onto a data structure comprising a binary tree (block 806). Projecting causes each DOM node to receive and store a pointer to or index indicator representative of a respective associated binary tree node thereby creating a map between the parse tree data structure and the data structure of the binary tree. In the example embodiments the data structure of the binary tree is a height balanced binary tree, but as previously noted a binary tree will suffice.

Process 800 receives a request to manipulate the parse tree data structure (block 808). The request may contain one of an insert DOM node or a delete DOM node request. Concomitant to receiving a request to insert a new DOM node into the parse tree data structure, receiving an indication of a parse tree insert location for the new DOM node to be inserted (block 810).

Process 800 inserts the new DOM node at the indicated parse tree insert location (block 812). Process 800 creates a corresponding binary tree node (block 814). Process 800 associates the corresponding binary tree node with the new DOM node (block 816).

Process 800 identifies a binary tree insert point location for the corresponding binary tree node associated with the new DOM node (block 818).

Process 800 inserts the corresponding binary tree node into the binary tree at the identified binary tree insert point location (block 820), and in one embodiment a height balancing operation is then performed on the binary tree data structure.

Process 800 receives a document order comparison request to determine an earlier of a first given DOM node and a second given DOM node (block 822). Responsive to the receiving of the document order comparison request, the processor performs a binary tree document order comparison (block 824).

The binary tree document order comparison comprises as set of steps including obtaining a first corresponding binary tree node associated by the projection with the first given DOM node and a second corresponding binary tree node associated by the projection with the second given DOM node (block 826). Process 800 determines which of the first corresponding binary tree node and the second corresponding binary tree node is earlier in a traversal order of the binary tree (block 828). Process 800 selects a DOM node associated with a determined earlier corresponding binary tree node as the earlier DOM node (block 830). Process 800 returns an indication of the selected earlier DOM node as the earlier of the first given DOM node and the second given DOM node (block 832) and terminates thereafter (block 834).

Figure 9:
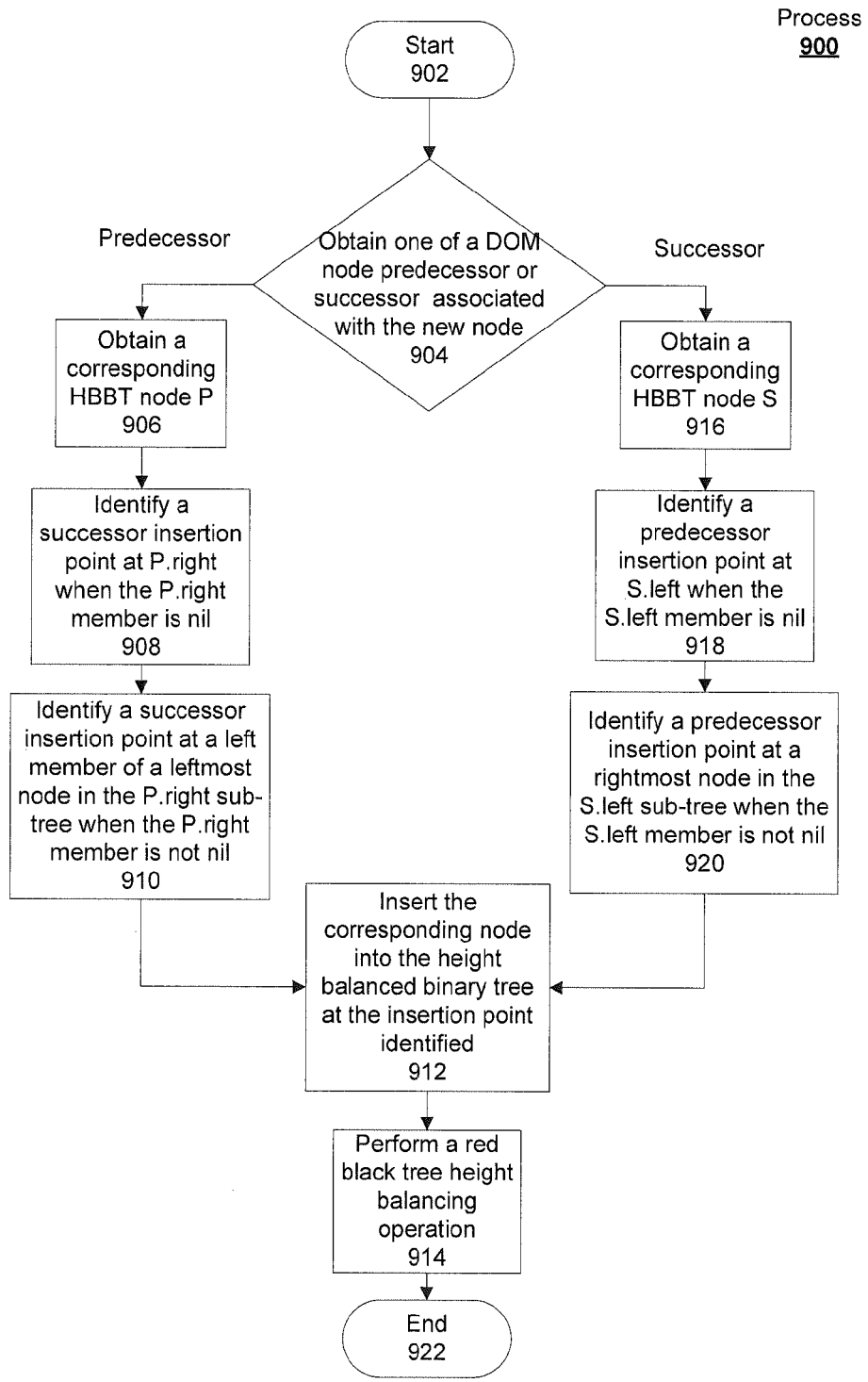
FIG. 9 is a flowchart of an HBBT insert using the parse tree manager of FIG. 3 for various embodiments of the disclosure.

With reference to FIG. 9 a flowchart of a HBBT insert using the parse tree manager of FIG. 3 for various embodiments of the disclosure is presented. Process 900 is an example of an embodiment specialized insert operation of the parse tree manager 300 of FIG. 3. Process 900 is further representative of blocks 818, 820 and 822 of process 800 of FIG. 8.

Process 900 begins (block 902) at the point after the new DOM node is inserted at the indicated parse tree location 812, the corresponding binary tree node has been created 814 and associated with the new DOM node 816. Process 900 obtains one of a DOM predecessor or DOM successor, relative to a newly inserted DOM node, in the pre-order traversal order of the DOM (block 904). A request to insert a new DOM node is accompanied by a respective associated DOM node in the parse tree data structure of the DOM. The respective associated DOM node may be either a predecessor DOM node or a successor DOM node. The information is needed to provide a relative positioning of the new DOM node with respect to DOM nodes already in document order.

In response to obtaining a predecessor DOM node, process 900 obtains a corresponding HBBT node P (block 906). Process 900 identifies a successor insertion point as the right member of P, denoted P.right, when the P.right member is nil (block 908). Otherwise, process 900 identifies a successor insertion point at left member of the leftmost node of the P.right sub-tree, when the P.right member is not nil (block 910).

Process 900 inserts the corresponding HBBT node into the height balanced binary tree at the insertion point identified (block 912). A red-black tree balancing operation is performed by process 900 (block 914) and process 900 terminates thereafter.

Returning to block 904, in response to obtaining a successor DOM node, process 900 obtains a corresponding HBBT node S (block 916). Process 900 identifies a predecessor insertion point at the left member of S, denoted S.left, when the S.left member is nil (block 918). Otherwise, process 900 identifies a predecessor insertion point at rightmost node of the S.left sub-tree, when the S.left member is not nil (block 920).

Process 900 then processes block 912 to insert the new corresponding binary tree node into the binary tree at the insertion point identified. In the case of a height balanced binary tree, process 900 executes block 914 to perform a height balancing operation, such as a set of red-black tree rotations, on the binary tree data structure. Process 900 then terminates at block 922, corresponding to block 822 of FIG. 8.

Figure 10:
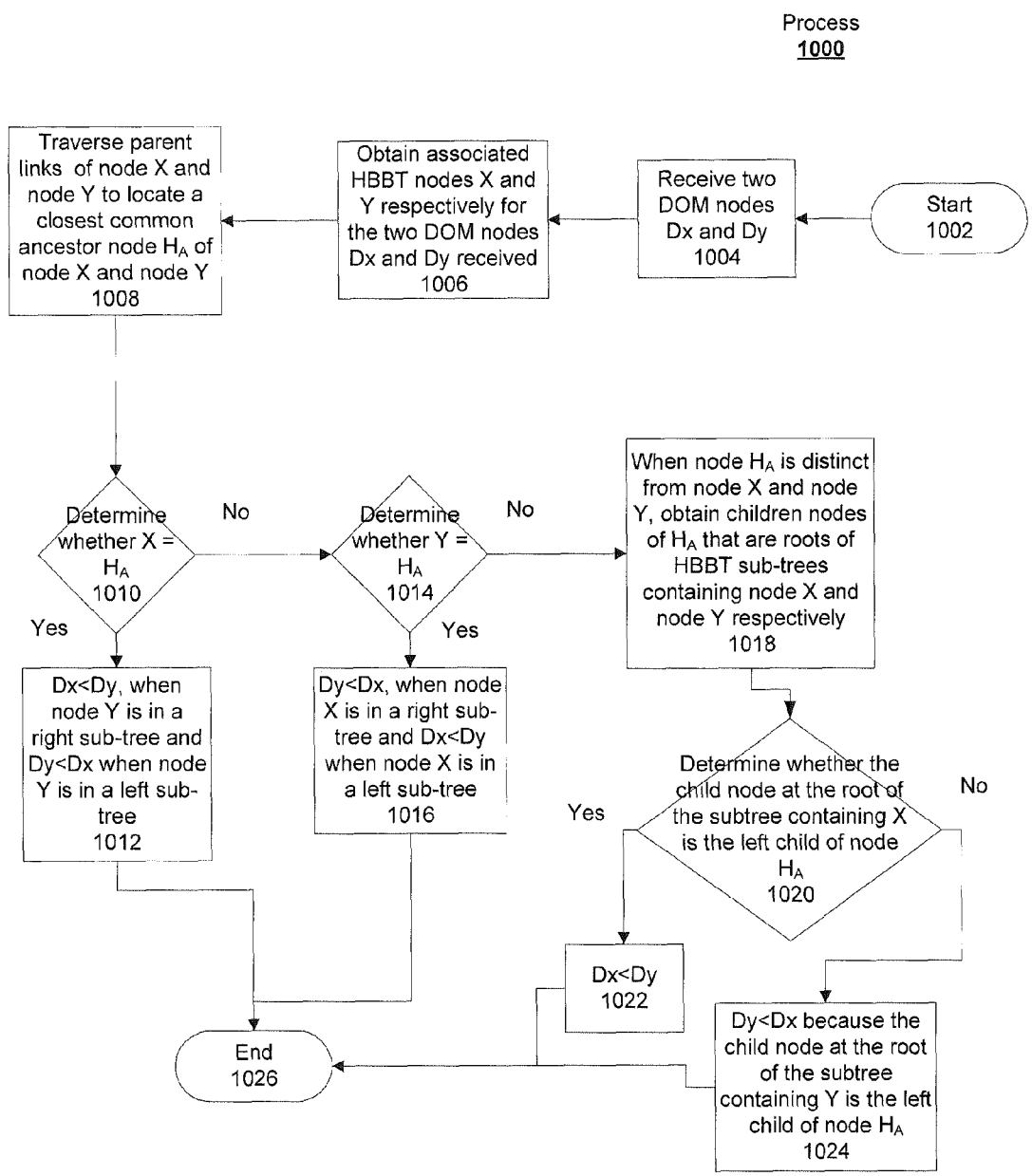
FIG. 10 is a flowchart of an HBBT comparison using the parse tree manager of FIG. 3 for various embodiments of the disclosure.

With reference to FIG. 10 a flowchart of an HBBT comparison using the parse tree manager of FIG. 3 for various embodiments of the disclosure is presented. Process 1000 is an example of an embodiment height balanced binary tree comparison operation of the parse tree manager 300 of FIG. 3. Process 1000 is further representative of block 812 of process 800 of FIG. 8.

Process 1000 begins (block 1002) and receives input in the form of two DOM nodes, node $D_X$ and node $D_Y$ (block 1004). Process 1000 obtains associated HBBT nodes of node X and node Y respectively for the two DOM nodes, node $D_X$ and node $D_Y$ (block 1006).

Process 1000 traverses parent links of the respective HBBT node X and node Y to locate a common ancestor node $H_A$ of node X and node Y (block 1008). Having located node $H_A$, process 1000 determines whether node X is equal to node $H_A$ (block 1010). Responsive to a determination that node X is equal to node $H_A$, process 1000 identifies $D_X<D_Y$ when node Y is in a right sub-tree and identifies $D_Y<D_X$ when node Y is in a left sub-tree (block 1012). Process 1000 terminates thereafter (block 1022).

Responsive to a determination that node X is not equal to node $H_A$, process 1000 determines whether node Y is equal to node $H_A$ (block 1014). Responsive to a determination that node Y is equal to node $H_A$, process 1000 identifies $D_Y<D_X$ when node X is in a right sub-tree and identifies $D_X<D_Y$ when node X is in a left sub-tree (block 1016). Process 1000 terminates thereafter (block 1022).

Responsive to a determination that neither node X or node Y is equal to node $H_A$, process 1000 determines node $H_A$ is distinct from node X and node Y and obtains the children nodes of node $H_A$ that are roots of HBBT sub-trees containing node X and node Y respectively (block 1018).

Process 1000 determines whether the child node at the root of the subtree containing X is the left child of node $H_A$ (block 1020). Responsive to a determination that the child node at the root of the subtree containing X is the left child of node $H_A$, process 1000 identifies $D_X<D_Y$ (block 1022) and terminates thereafter (block 1026). Responsive to a determination that the child node at the root of the subtree containing X is not the left child of node $H_A$, process 1000 identifies $D_Y<D_X$ (block 1022) because the child node at the root of the subtree containing Y is the left child of node $H_A$ (block 1024) and terminates thereafter (block 1026). In the example just described, the child node at the root of the subtree containing X is not equal to the child node at the root of the subtree containing Y because node $H_A$ represents the closest common ancestor of node X and node Y.

With reference to the DOM tree traversal comparison method, rather than the binary tree comparison method of FIG. 10, as a primary comparison method, the DOM tree traversal comparison method typically exhibits performance issues as the number of nodes involved increases. When used as a viable secondary comparison method within the relaxed node index method, the use is typically confined to a limited case in which the index values of the DOM nodes being compared are equal (e.g. $K_X=K_Y$). As stated previously, the DOM tree traversal comparison method consists of first traversing the parent links of node $D_X$ and node $D_Y$ to locate the closest common DOM ancestor node A. When one of node $D_X$ and node $D_Y$ is the ancestor node A, then the node equivalent to node A is the earlier node in document order. Otherwise, the children, node $C_X$ and node $C_Y$, of the closest common ancestor node A are obtained, where node $C_X$ is the root node of the DOM sub-tree containing node $D_X$, and node $C_Y$ is the root node of the DOM sub-tree containing node $D_Y$. When node $C_X$ is earlier in the child list of node A, then node $D_X$ is the earlier node in document order, otherwise node $D_Y$ is the earlier node in document order.

Figure 11:
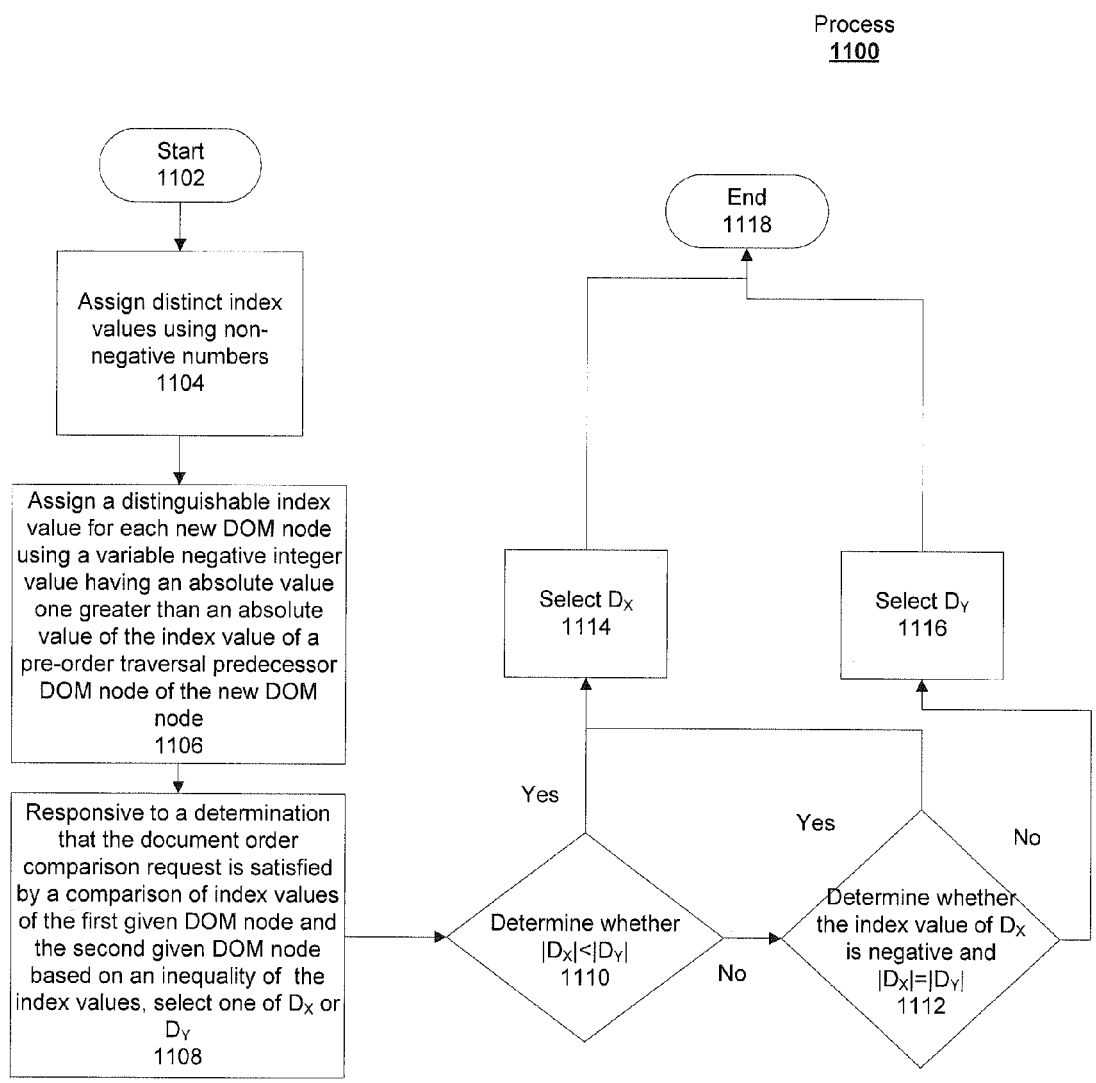
FIG. 11 is a flowchart of a document order comparison using the parse tree manager of FIG. 3 for various embodiments of the disclosure.

With reference to FIG. 11 a flowchart of a document order comparison using the parse tree manager of FIG. 3 for various embodiments of the disclosure is presented. Process 1100 is an example of an embodiment using an index value comparison operation of the parse tree manager 300 of FIG. 3.

Process 1100 begins (block 1102) and assigns distinct index values using non-negative numbers (block 1104). Process 1100 assigns a distinguishable index value for each new DOM node using a variable negative integer value whose absolute value is one greater than an absolute value of the index value of a pre-order traversal predecessor DOM node of the new DOM node (block 1106).

Responsive to a determination that the document order comparison request is satisfied by a comparison of index values of the first given DOM node and the second given DOM node based on an inequality of the index values, process 1100 selects an earlier DOM node as one of the first given DOM node, denoted $D_X$, and the second DOM node, denoted $D_Y$ (block 1108). The selection is performed in process 1100 by index comparison when the index values of $D_X$, and $D_Y$ are not equal, by determining whether the absolute value of the index of $D_X$, denoted $|D_X|$, is less than the absolute value of the index of $D_Y$, denoted $|D_Y|$ (block 1110). Responsive to a determination that $|D_X|<|D_Y|$, process 1100 selects $D_X$ (block 1114) and terminating thereafter (block 1118).

Responsive to a determination that $|D_X|\geq|D_Y|$, process 1100 determines whether the index value of $D_X$ is negative and $|D_X|=|D_Y|$ (block 1112). Responsive to a determination the index value of $D_X$ is negative and $|D_X|=|D_Y|$, process 1100 selects $D_X$ (block 1114) and terminates thereafter (block 1118) as before.

Responsive to a determination either the index value of $D_X$ is not negative or the absolute value of the index of $D_X$ is not equal to the absolute value of the index of $D_Y$, process 1100 selects $D_Y$ (block 1116) and terminates thereafter (block 1118).

Figure 12:
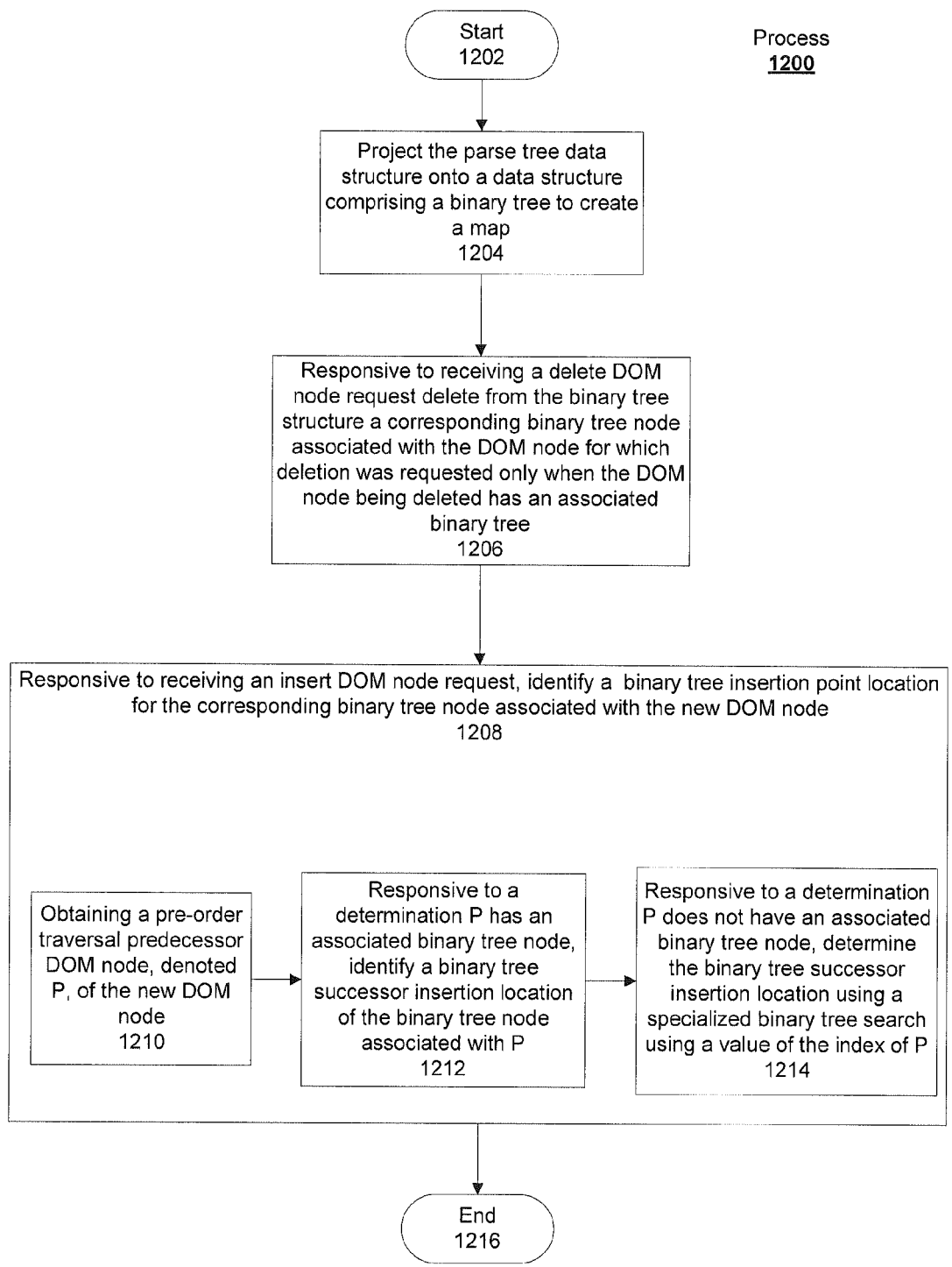
FIG. 12 is a flowchart of a parse tree manipulation using the parse tree manager of FIG. 3 for various embodiments of the disclosure.

With reference to FIG. 12 a flowchart of a parse tree manipulation using the parse tree manager of FIG. 3 for various embodiments of the disclosure is presented. Process 1200 is an example of an embodiment using delete operation from and an insert operation into a parse tree using the parse tree manager 300 of FIG. 3.

Process 1200 begins (block 1202) and projects a parse tree data structure received onto a data structure comprising a binary tree to create a map (block 1204). The projection initially stores no associations of DOM nodes to binary tree nodes, thereby creating an initially empty map between the parse tree data structure and an initially empty binary tree data structure.

Responsive to receiving by process 1200, a delete DOM node request, process 1200 deletes from the binary tree structure a corresponding binary tree node associated with the DOM node for which deletion was requested only when the DOM node being deleted has an associated binary tree node (block 1206).

Responsive to receiving by process 1200 an insert DOM node request for a new DOM node, process 1200 identifies a binary tree insertion point location for the corresponding binary tree node associated with the new DOM node (block 1208). Sub-processes of blocks 1210, 1212 and 1214 elaborate on the process identified in block 1208. Specifically, process 1200 first obtains a pre-order traversal predecessor DOM node, denoted P, of the new DOM node (block 1210). Responsive to a determination P has an associated binary tree node; process 1200 identifies a binary tree successor insertion location of the binary tree node associated with P (block 1212) in the manner previously described. Responsive to a determination P does not have an associated binary tree node, process 1200 determines the binary tree insertion point location using a specialized binary tree search using a value of the index of P in the manner previously described (block 1214) and terminates thereafter (block 1216).

Operations that re-index the parse tree data structure and return the projection and the binary tree data structure to an empty state may also be performed within the context of an embodiment of process 1200. Further a language processor may be invoked to determine whether to automatically perform the re-index operation using a structural change detector, wherein the structural change detector sets a flag that indicates insertion of nodes since a last indexing operation. Further the structural change detector may only flag insertion of non-text nodes, wherein a text node insertion to change a value representative of an empty string to a value representative of non-empty string is regarded as an informational mutation, rather than a structural manipulation of the parse tree data structure.

Process 1200 may alternatively include use of a language processor which is responsive to an indication, by a language author using an attribute, indicating the requirement to apply, when executing a block of code associated with the attribute, at least one optimization from a set containing at least one of the following: binary tree projection, binary tree projection only on newly inserted nodes, height balancing, relaxed node index method, and variable negative index assignment.

With reference to using the relaxed node method in combination with a secondary comparison using the HBBT mapping method, when the depth first search is used to create a node index for the DOM tree, a parallel HBBT is also created in which one node is associated with each existing DOM node. Each DOM insert operation is augmented by not only assigning a negative node index previously described, but also by performing an HBBT insert operation. Similarly, DOM deletion is augmented using the HBBT delete operation. When the relaxed node index method is used in combination with the HBBT map method as a secondary tree-based comparison technique, the insert and delete operations require O(log N) expected time and node comparison is often O(1) and only degrades to O(log N) in the special case described previously.

With reference to a secondary comparison via a refined HBBT mapping method, in a context of the relaxed node index method with variable negative index assignment, the HBBT mapping method can be improved, using refined HBBT insert and refined HBBT delete operations, enabling only newly inserted DOM nodes with a negative index value to have representative HBBT nodes. Using this combination of refined operations, the size of the HBBT is not N, the number of DOM nodes, but rather reduced to n, the number of newly inserted DOM nodes since a last DOM node index assignment operation.

As in the secondary comparison of two DOM nodes $D_X$ and $D_Y$, the HBBT-based comparison is used without alteration because only in the special case when $K_X=K_Y$, is it used, wherein both node $D_X$ and node $D_Y$ have negative index values and also both have associated HBBT nodes. Each HBBT node is thus augmented with an additional integer value that will, in some cases, be used as a key for finding the node in the HBBT. The key is, in this instance, assigned a non-negative value K, where the associated DOM node has the negative index value of $-K-1$.

When the depth first search is used to create the node index for the DOM tree, all existing DOM nodes are set to have no associated HBBT node, and the HBBT is set to empty. The DOM insert operation is augmented by the refined HBBT insert operation, and the DOM delete operation is augmented by the refined HBBT delete operation.

With reference to the refined HBBT delete, when a DOM node is deleted, an additional conditional test is added to determine whether the DOM node has an associated HBBT node, and a normal HBBT delete is only performed when there is an associated HBBT node.

With reference to the refined HBBT insert, when a new DOM node is inserted, the predecessor DOM node or successor DOM node is still identified, because an associated DOM node is needed to complete the variable negative index assignment for the DOM node being inserted. When the identified predecessor or successor DOM node has a negative index value, the original HBBT insert operation is performed. When the identified predecessor or successor DOM node has a non-negative index value, the node does not have an HBBT node to use as a basis for determining the insertion point for the new HBBT node associated with the new DOM node. In this case, the insertion point is instead determined using a key search of the HBBT based on the index value of the identified predecessor or successor DOM node.

When the predecessor DOM node of the new DOM node was identified, let K denote a respective non-negative index value. When the successor DOM node of the new DOM node was identified, let K+1 denote a respective non-negative index value. Using either approach, the new DOM node is assigned an index $-K-1$, and the value K is used in a key search of the HBBT for the insertion point according to a binary search tree navigation. The search starts at the root node of the HBBT. When K is less than the HBBT node key value, then navigate to the left child when there is a child or select the left pointer as the insertion point when nil. Otherwise, when K is greater than to the HBBT node key value, navigate to the right child when a child exists or select the right pointer as the insertion point when nil. Otherwise, when K is equal to the HBBT node key value, navigate to the left child when the predecessor DOM node was given, and navigate to the right child when the successor DOM node was given. Continue navigating nodes as described until the insertion point is obtained. Then, insert the new HBBT node associated with the new DOM node, assign a key value K, and perform a height balancing operation.

In reference to automatic and manual re-indexing, regardless of the secondary tree-based comparison method used, applications of the relaxed node index method typically benefit from the ability to re-index the DOM nodes at selected points in the processing. Re-indexing is performed by invoking a depth first search, which assigns non-negative index values to all existing DOM nodes, extinguishing any negative index values that were previously assigned to any of the DOM nodes. The author of an application, using an explicit invocation at any point or points in a DOM processing sequence the author deems appropriate, can access re-indexing. Re-indexing may also be provided as an automated behavior of an application language when the language supports epochs of index relaxation that are distinguishable from epochs of index non-volatility, for example when using XForms language.

An XForms insert action typically sets a flag called a rebuild flag, and inserts one or more nodes that receive a negative index value under this method. Many further XForms actions may occur in a sequence of XForms actions, including many additional insert actions. During the sequence of XForms actions, an application author may elect to explicitly invoke a rebuild action. Otherwise, when the rebuild flag is still set in the XForms processor at the end of an outermost action sequence, the XForms processor automatically invokes the rebuild action.

Whether the rebuild is automatically invoked or explicitly invoked, a new depth first search can be performed to re-index XML data instances that have been amended to contain DOM nodes with negative values. This is implemented by reusing the stale flag technique. When a DOM node is inserted, the stale flag is set to indicate the next XForms rebuild should re-index the nodes. The stale flag is cleared when the nodes are re-indexed.

In one refinement, handling of text node insertions may be performed as informational changes rather than structural changes. The handling technique can be further refined to ignore text DOM nodes assigned a negative index value, so that re-indexing only occurs when nodes, such as elements or attributes, have been inserted that are more typically pertinent in document order comparisons in XPath expressions. This can be easily implemented by not setting the stale flag when a text node is inserted.

In another refinement, optimizing XForms DOM element initialization can be used in combination with the relaxed node index method to optimize XML data instance initialization relative to current practice using XForms. When an XML instance is parsed, elements with empty content do not receive a child text node. When those elements are subjected to an informational mutation during processing, for example, when the elements are assigned a non-empty text value, a text node is created to store the non-empty value. Technically, this is a structural mutation of the DOM (that is to say, a structural manipulation of the parse tree data structure) since a new node is inserted, and in prior practice the insertion caused the node index to be marked stale.

However, by creating empty text node children for all leaf elements the nodes are indexed on initialization and no DOM structural changes occur when an element text value is changed. Moreover, any time a DOM element leaf was inserted, the empty text node is created for holding respective content enabling accommodation in a following re-index operation. The creation of empty text nodes uses available memory and time, especially on form initialization but often in the whole processing lifecycle of the form because, in a multistep business process or fill experience, a user may only fill out the parts of the form that are relevant to the transaction details or business process step of the user. The empty text nodes for the non-relevant parts of the form should not be created, but there is no way to easily determine or specify the non-relevant sections of the XML data during parse tree or DOM initialization.

Using the relaxed node index method, the technique of creating empty text nodes for leaf elements can simply be abandoned. When a text node is inserted to store a non-empty value provided by a user, the text node receives a negative index value, but the stale flag is not set. Therefore, when only text nodes are added, the mutations are handled as informational, not structural, which is coincident with the XForms processing model which does not invoke a rebuild when only value changes have occurred. The new text nodes are extremely unlikely to be involved in document order comparisons of XPath expressions typically executed in XForms. Moreover, even should there be unusual XPath expressions that do involve these text nodes in document order comparisons, the text nodes are likely to be the lone children of respective parent elements, in which case both the index assignment and comparisons to other nodes will be O(1) under the variable negative index assignment technique.

Thus is presented in an illustrative embodiment a method implemented by one or more processors for manipulating parse tree data and efficiently performing node order comparisons within the parse tree. The method when executed by the one or more processors receives a parse tree data structure, wherein the parse tree data structure is representative of a document object model (DOM) tree data structure and projects the parse tree data structure received onto a data structure comprising a binary tree, wherein the projection stores an association between each DOM node and a respective associated binary tree node thereby creating a map between the parse tree data structure and the binary tree data structure. The method is further executed by the one or more processors to receive a request to manipulate the parse tree data structure, wherein the request comprises an insert new DOM node request. Concomitant to receiving the request requesting to insert the new DOM node into the parse tree data structure, receiving by the method an indication of a parse tree insert location for the new DOM node to be inserted and in response to receiving by the method the indication of the parse tree insert location, the method inserts the new DOM node at the indicated parse tree insert location. The method performs the insertion by creating a corresponding binary tree node; associating the corresponding binary tree node with the new DOM node; identifying a binary tree insertion point location for the corresponding binary tree node associated with the new DOM node and inserting the corresponding binary tree node into the binary tree at the identified binary tree insertion point location. The method is further executed by the one or more processors to receive a document order comparison request to determine an earlier of a first given DOM node and a second given DOM node. Responsive to receiving the document order comparison request, the one or more processors perform a binary tree document order comparison by obtaining a first corresponding binary tree node associated by the projection with the first given DOM node and a second corresponding binary tree node associated by the projection with the second given DOM node. The one or more processors determine which of the first corresponding binary tree node and the second corresponding binary tree node is earlier in a traversal order of the binary tree and select a DOM node associated with a determined earlier corresponding binary tree node as the earlier DOM node. The one or more processors further return an indication of the selected earlier DOM node as the earlier of the first given DOM node and the second given DOM node.

According to an embodiment, a computer program product for manipulating parse tree data and efficiently performing node order comparisons within the parse tree comprises a computer readable data storage device containing computer executable program code stored thereon. The computer executable program code comprises computer executable program code for receiving a parse tree data structure, wherein the parse tree data structure is representative of a document object model (DOM) tree data structure; computer executable program code for projecting the parse tree data structure received onto a data structure comprising a binary tree, wherein the projection stores an association between each DOM node and a respective associated binary tree node thereby creating a map between the parse tree data structure and the binary tree data structure; and computer executable program code for receiving a request to manipulate the parse tree data structure, wherein the request comprises an insert DOM node request for a new DOM node; computer executable program code for receiving, concomitant to receiving the request requesting to insert the new DOM node into the parse tree data structure, an indication of a parse tree insert location for the new DOM node to be inserted.

The computer executable program code further comprises computer executable program code responsive to receiving by the processor the indication of the parse tree insert location, for: inserting the new DOM node at the indicated parse tree insert location; creating a corresponding binary tree node; associating the corresponding binary tree node with the new DOM node; identifying a binary tree insertion point location for the corresponding binary tree node associated with the new DOM node; and inserting the corresponding binary tree node into the binary tree at the identified binary tree insertion point location.

The computer executable program code further comprises computer executable program code for receiving a document order comparison request to determine an earlier of a first given DOM node and a second given DOM node; and computer executable program code responsive to the receiving of the document order comparison request, for performing a binary tree document order comparison by: obtaining a first corresponding binary tree node associated by the projection with the first given DOM node and a second corresponding binary tree node associated by the projection with the second given DOM node; determining which of the first corresponding binary tree node and the second corresponding binary tree node is earlier in a traversal order of the binary tree; selecting a DOM node associated with a determined earlier corresponding binary tree node as the earlier DOM node; and returning an indication of the selected earlier DOM node as the earlier of the first given DOM node and the second given DOM node.

According to an embodiment, an apparatus for manipulating parse tree data and efficiently performing node order comparisons within the parse tree, comprises a communications fabric; a memory connected to the communications fabric, wherein the memory contains computer executable program code; a communications unit connected to the communications fabric; an input/output unit connected to the communications fabric; a display connected to the communications fabric and a processor unit connected to the communications fabric. The processor unit executes the computer executable program code to direct the apparatus to receive a parse tree data structure, wherein the parse tree data structure is representative of a document object model (DOM) tree data structure and project the parse tree data structure received onto a data structure comprising a binary tree, wherein the projection stores an association between each DOM node and a respective associated binary tree node thereby creating a map between the parse tree data structure and the binary tree data structure.

The processor unit executes the computer executable program code to further direct the apparatus to receive a request to manipulate the parse tree data structure, wherein the request comprises an insert DOM node request for a new DOM node and concomitant to receiving the request requesting to insert the new DOM node into the parse tree data structure, receive an indication of a parse tree insert location for the new DOM node to be inserted.

Responsive to receiving the indication of the parse tree insert location, the processor unit executes the computer executable program code to further direct the apparatus to insert the new DOM node at the indicated parse tree insert location; create a corresponding binary tree node; associate the corresponding binary tree node with the new DOM node; identify a binary tree insertion point location for the corresponding binary tree node associated with the new DOM node; and insert the corresponding binary tree node into the binary tree at the identified binary tree insertion point location.

The processor unit executes the computer executable program code to further direct the apparatus to receive a document order comparison request to determine an earlier of a first given DOM node and a second given DOM node and responsive to the receiving of the document order comparison request, perform a binary tree document order comparison by: obtaining a first corresponding binary tree node associated by the projection with the first given DOM node and a second corresponding binary tree node associated by the projection with the second given DOM node; determining which of the first corresponding binary tree node and the second corresponding binary tree node is earlier in a traversal order of the binary tree; selecting a DOM node associated with a determined earlier corresponding binary tree node as the earlier DOM node; and returning an indication of the selected earlier DOM node as the earlier of the first given DOM node and the second given DOM node.

The methods thus disclosed have broad applicability particularly in the domain of forms products in the area of manipulating XML DOMs and efficiently performing node order comparisons within the parse tree with XPath, and the innovative techniques disclosed herein may drive efficiency of navigating a dynamic general tree as a data structure. General trees often occur in practice as in-memory representations of parse trees for languages and data formats.

Computer languages include hypertext markup language (HTML), cascading style sheets (CSS), JavaScript, and Java as well as many languages based on XML format, such as extensible stylesheet language transformations (XSLT) and scalable vector graphics (SVG) use parse tree data. Parse trees would be created to represent a program within a program design environment. Tree navigation would be performed to search for program components having desired characteristics, and manipulations could be performed once desired components are found, such as implementing aspect oriented injections into the code.

Natural language content is also represented using a parse tree. Tree navigation is used to identify meaning based on patterns. Manipulation would be done to construct or alter meaning, such as generating language to express or alter thoughts. The manipulation could also include dynamic translation from one language to another.

Embodiments of the disclosure providing the most value in the shortest term are typically those, which both manipulate the parse tree structure and perform node order comparisons. Embodiments of the disclosure would typically be usable in any software that manipulates a parse tree and uses a tree order enforcing expression language to identify the nodes to manipulate and compare, wherein tree order enforcement of the expression language naturally results in many document order comparisons among the nodes over which the expressions operate.

For example, a case of XML being the format of data being parsed into a document object model (DOM) and then using XPath as the document order enforcing expression language that indicates the nodes to insert, where to insert the nodes, or which nodes to delete. In the XML context, this processing includes changing the character content of an element between empty and non-empty, since those operations correspond to creating or destroying text nodes, which are structural manipulations of the parse tree.

Software examples of use of embodiments of the disclosure are numerous; including business analytic or big data operators as well as web service request and response code that parses an XML SOAP request or response envelope then populates the request or response envelope with a data payload. Graphic user interface design environments provide mapping mechanisms that typically reduce to a set of XPath expressions indicating specific data to push to a target location, and the run-time implementations of those mappings then perform the XML manipulations using evaluations of the XPath expressions. Java, C++ or C# code can also use XPath to identify nodes which are then populated with data. Neither product level mapping code nor custom code is limited to web services and business analytic or big data operators. Typically any type of data population activity is subject to beneficial use of embodiments of the disclosure.

In the XML Forms domain, XML forms include a scripting language with directives named insert, delete and setvalue. These script directives give a form author the capability to specify manipulations of the XML data within the Form to control the user experience in the form. Although a form may be the driver for an end-user client-side experience of a data collection web application, the XML processing is almost always performed on the server side.

In addition the language processor automatically performing re-indexing and/or emptying an HBBT, the language processor is responsive to an indication by a language author, for example, an attribute, indicating which optimization(s) from among a set of predetermined optimizations to apply when running an indicated block of code. For example, a first value of an optimization identifier is used to indicate a use of the relaxed node index method when procedures of a code particular code segment would benefit best from just using relaxed indexing. In another example, a second value of the optimization identifier is used when another code segment benefits from using variable relaxed indexing and HBBT together. A default may be set to not applying any of the predetermined optimizations.

Whether using web services code, a dedicated server-side processor or mapper, a business analytic or big data operator, or any other typical code running on the server-side, the efficiency of an embodiment of the disclosure is important due to the number of simultaneous application instances an embodiment is expected to serve. First, there is typically a great multiplicity of expressions that are evaluated during the course of data manipulations. This is true of forms, of mapping code, and of normal application-specific data population code. Thus, there are many expressions to be evaluated per each of many users. Second, a single expression that address a parse trees typically contains multiple location steps that navigate from a root of the parse tree down to internal nodes and leaves to obtain nodes to be manipulated. Each location step generates a node set that has to be put in parse tree order, or document order (in the XML domain, the XML data instance provides the document of interest). Third, each location step can contain filters that produce new node sets, and each filter contains sub-expressions that may be comprised of more location steps and filters. The XPath expression language is recursive. Fourth, the formation of an ordered node set typically involves systematic comparisons of the nodes. Thus, in total there are many node comparisons per (location step or filter) multiplied by many (location steps and filters) per expression multiplied by many expressions per application instance multiplied by many application instances per server.

Embodiments of the disclosure optimize a comparison function that takes two nodes of a parse tree and indicates which of the two nodes comes earlier in the parse tree, where earlier means that a respective node would be visited earlier in a left-to-right pre-order depth first search.

A first illustrative embodiment of the disclosure involves a novel projection of the structure of the dynamic parse tree onto the structure of a dynamic height balanced binary tree. A general tree is a different kind of mathematical object than a binary tree, in the same sense that a two dimensional space is a different geometric object from a three dimensional space. Inserting a node into a parse tree is a minor structural change in which a single edge is added to connect the new node to a respective parent, and one or two structural changes are made to attach the node to its preceding and succeeding siblings in the parent's children list. In the height balanced binary tree, there may be a corresponding avalanche effect of structural changes, such as a series of red-black tree rotations, because a node simply cannot have more than two children. So two very similar looking parse trees may have very different corresponding binary trees that nonetheless, by using an embodiment of the disclosure, are maps that efficiently encode the parse tree order of the parse tree in a way that allows efficient transition from one binary tree structure to the other tree structure. The meta-technique used in the disclosed methods is a reduction that maps a problem in one domain (general trees) into a problem in another domain (binary trees) where the problem is more efficiently or more easily solved. The innovation exhibited in a reduction is derived from identifying what to map and how to derive a benefit from the mapping.

A second illustrative embodiment of the disclosure is a relaxed node index method. This relaxed node index method is based on another meta-technique called relaxation in which some strictly applied computing rule is relaxed in a way that reduces a workload while still allowing the ability to achieve some objective. The innovation in any relaxation is achieved in identifying what to relax, how to perform the relaxation, and how to still derive benefits from the relaxation. In this illustrative embodiment of the disclosure, the condition of having the node indexes strictly reflect a depth first indexing of the parse tree is relaxed. Instead of a strict reflection, marking of the index map as stale when a parse tree manipulation happens is suppressed. Observation revealed that any deletion did not affect the index comparability of any remaining nodes. Further, newly inserted nodes are assigned an alternative index to indicate they are not directly comparable to the original nodes having valid indexes. The alternative index assignment was improved to mark newly inserted nodes as being in a region of insertion between two specific original nodes having valid indexes. This process causes all newly inserted nodes to be comparable by index to all other nodes except those nodes in the same region.

An embodiment includes a method for manipulating dynamic parse tree data and efficiently performing node order comparisons within the parse tree when executed by one or more processors projects a structure of a dynamic parse tree onto a structure of a dynamic height balanced binary tree (HBBT), wherein each node of the dynamic parse tree receives one of either a pointer or an index indicator for storing a value representative of an HBBT node, thereby creating a mapping between nodes in the structure of the dynamic parse tree structure and corresponding nodes in the structure of the HBBT. The method is further executed to associate a new HBBT node with a new DOM node to be inserted into the dynamic parse tree by obtaining one of a predecessor DOM node or successor DOM node of the new DOM node of the dynamic parse tree node, wherein an HBBT node of the predecessor DOM node or the successor DOM node of the new DOM node to be inserted into the dynamic parse tree node is obtained, wherein an HBBT comparison comprises receiving two dynamic parse tree nodes, of $D_X$ and $D_Y$, and obtains respective associated HBBT nodes, X and Y, traverses parent links of HBBT nodes X and Y to find a closest common ancestor node $H_A$ of nodes X and Y, determining when node X equals the closest common ancestor node $H_A$, then $D_X < D_Y$ and when node Y equals the closest common ancestor node $H_A$, then $D_Y < D_X$ and otherwise, obtaining children $H_X$ and $H_Y$ of the closest common ancestor node $H_A$ that are each roots of HBBT sub-trees containing, respectively, X and Y wherein when $H_X$ is a left child of the closest common ancestor node $H_A$, then $D_X < D_Y$, and otherwise $D_Y < D_X$ because $H_Y$ is the left child of the closest common ancestor node $H_A$, wherein $H_X \neq H_Y$ because $H_A$ is the closest common ancestor of X and Y.

The method further executes performing one of a structural tree successor operation or a structural tree predecessor operation, respectively, to obtain an insertion point for the new HBBT node associated with the new DOM node to be inserted into the dynamic parse tree node, wherein when a dynamic parse tree predecessor DOM node is provided, a corresponding HBBT node P is obtained, and a successor insertion point is a corresponding HBBT P.right when it is nil, otherwise a left member of a leftmost node in a corresponding HBBT P.right sub-tree, when P.right is not nil and when the dynamic parse tree successor DOM node is provided, the corresponding HBBT node S is obtained, and a predecessor insertion point is a corresponding HBBT S.left when it is nil, and a right member of a rightmost node in a corresponding HBBT S.left sub-tree, when S.left is not nil.

The method further executes inserting the new HBBT node, associated with the new DOM node, at the insertion point in the HBBT and performing a red-black tree height balancing of the HBBT.

Responsive to a request for a dynamic parse tree DOM node deletion, wherein the dynamic parse tree DOM node to delete is inherently known and the HBBT node associated with the dynamic parse tree DOM node of the request is obtained, the method further executes deleting the HBBT node associated with the dynamic parse tree DOM node and the dynamic parse tree DOM node, performing a red-black tree height balancing of the HBBT.

The height balanced binary tree method and the relaxed node index method and associated respective refinements of the disclosure form independent solutions because each can be used independently of the other to derive most of the benefits of the other. In some cases the height balanced binary tree solution outperforms the relaxed node index method, and in other cases the relaxed node index method is the more efficient solution. Each is independently beneficial, but an overall better solution for some cases comes from using the relaxed node index method and then dependently falling back to the height balanced binary tree solution for comparison of nodes that are newly inserted into the same region of the parse tree.

Embodiments of the disclosure are directed toward optimizing the tree order enforcing aspect of expressions used to navigate a dynamic parse tree as the parse tree undergoes manipulations. Application to XML and XPath in the examples provided should be regarded as a subdomain, and the further use of examples of the XML and XPath within an XML Form, or within mapping code, or within application-specific data population code should be regarded as further subdomains.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing a specified logical function. It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, and other software media that may be recognized by one skilled in the art.

It is important to note that while the present invention has been described in the context of a fully functioning data processing system, those of ordinary skill in the art will appreciate that the processes of the present invention are capable of being distributed in the form of a computer readable data storage device having computer executable instructions stored thereon in a variety of forms. Examples of computer readable data storage devices include recordable-type media, such as a floppy disk, a hard disk drive, a RAM, CD-ROMs, DVD-ROMs. The computer executable instructions may take the form of coded formats that are decoded for actual use in a particular data processing system.

A data processing system suitable for storing and/or executing computer executable instructions comprising program code will include one or more processors coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

What is claimed is:

1. A method for processing parse tree data, the method comprising:
  receiving, by a processor, a parse tree data structure, wherein the parse tree data structure is representative of a document object model (DOM) tree data structure;
  projecting, by the processor, the parse tree data structure received onto a data structure comprising a binary tree, wherein the projecting includes storing a projection that includes an association between each DOM node and a respective associated binary tree node thereby creating a map between the parse tree data structure and the binary tree data structure;
  receiving, by the processor, a request to manipulate the parse tree data structure, wherein the request comprises an insert DOM node request for a new DOM node;
  concomitant to receiving the request to manipulate the parse tree data structure, receiving, by the processor, an indication of a parse tree insert location for the new DOM node to be inserted;
  responsive to receiving the indication of the parse tree insert location:
    inserting the new DOM node at the indicated parse tree insert location;
    creating a corresponding binary tree node;
    associating the corresponding binary tree node with the new DOM node;
    identifying a binary tree insertion point location for the corresponding binary tree node associated with the new DOM node; and
    inserting the corresponding binary tree node into the binary tree at the identified binary tree insertion point location;
  receiving, by the processor, a document order comparison request to determine an earlier of a first given DOM node and a second given DOM node;
  responsive to receiving the document order comparison request, performing a binary tree document order comparison that comprises:
    obtaining a first corresponding binary tree node associated by the projection with the first given DOM node and a second corresponding binary tree node associated by the projection with the second given DOM node;
    determining which of the first corresponding binary tree node and the second corresponding binary tree node is earlier in a traversal order of the binary tree;
    selecting a DOM node associated with a determined earlier corresponding binary tree node as the earlier DOM node; and
    returning an indication of the selected earlier DOM node as the earlier of the first given DOM node and the second given DOM node; and
  responsive to receiving, by the processor, an insert DOM node request for a new DOM node, the processor identifies the binary tree insertion point location for the corresponding binary tree node associated with the new DOM node by:
    obtaining a pre-order traversal predecessor DOM node, denoted P, of the new DOM node;
    responsive to a determination P has an associated binary tree node, identifying a binary tree successor insertion location of the binary tree node associated with P;
    responsive to a determination P does not have an associated binary tree node, determining the binary tree insertion point location using a specialized binary tree search using a value of the index of P; and
    performing a height balancing operation on the binary tree such that the binary tree is a height balanced binary tree (HBBT).

2. The method of claim 1, wherein the projecting further includes:
  storing an association between each DOM node in a successive pre-order traversal of the parse tree and each binary tree node in a traversal order of the binary tree wherein the traversal order is in a successive in-order traversal of the binary tree.

3. The method of claim 1 further comprising:
  concomitant to receiving the parse tree data structure, receiving an assignment of index values for the DOM nodes consisting of distinct index values for each existing DOM node;
  concomitant to inserting the new DOM node at the indicated parse tree insert location, assigning a distinguishable index value to the new DOM node, wherein the distinguishable index value is distinguishable from all distinct index values in the received assignment; and
  responsive to receiving the document order comparison request:
    determining whether the document order comparison request can be satisfied by a comparison of the index values of the first given DOM node and the second given DOM node;
    responsive to a determination that the document order comparison request can be satisfied by a comparison of the index values of the first given DOM node and the second given DOM node, selecting as the earlier DOM node one of the first given DOM node and the second DOM node based on the comparison of the index values of the first given DOM node and the second given DOM node; and
    responsive to a determination that the document order comparison request can not be satisfied by the comparison of the index values of the first given DOM node and the second given DOM node, selecting as the earlier DOM node one of the first given DOM node and the second DOM node using the binary tree document order comparison.

4. The method of claim 3 further comprising:
assigning distinct index values using non-negative integers;
assigning a distinguishable index value for each new DOM node using a variable negative integer value whose absolute value is one greater than an absolute value of the index value of a pre-order traversal predecessor DOM node of the new DOM node;
responsive to a determination that the document order comparison request is satisfied by a comparison of index values of the first given DOM node and the second given DOM node based on an inequality of the index values, selecting as an earlier DOM node one of the first given DOM node and the second DOM node by performing a comparison of the index values of the first given DOM node and the second given DOM node.

5. The method of claim 1 further comprising:
receiving, by the processor, a request to manipulate the parse tree data structure, wherein the request comprises a delete DOM node request;
deleting from the parse tree data structure the DOM node for which deletion was requested; and
deleting from the binary tree structure a corresponding binary tree node associated with the DOM node for which deletion was requested.

6. The method of claim 5 further comprising:
subsequent to receiving, by the processor, a request to manipulate the parse tree data structure, wherein the request comprises a delete DOM node request, performing the height balancing operation on the binary tree such that the binary tree is a HBBT.

7. The method of claim 6 wherein:
the projecting initially stores no associations of DOM nodes to binary tree nodes, thereby creating an initially empty map between the parse tree data structure and an initially empty binary tree data structure; and
responsive to receiving, by the processor, a delete DOM node request, deleting from the binary tree structure a corresponding binary tree node associated with the DOM node for which deletion was requested only when the DOM node has an associated binary tree node.

8. The method of claim 7 further comprising:
performing a re-index operation on the assignment of index values for the DOM nodes to assign distinct index values for each existing DOM node; and
returning the projection and the binary tree data structure to an empty state.

9. The method of claim 8 wherein a language processor determines whether to automatically perform a re-index operation using a structural change detector, wherein the structural change detector sets a flag that indicates insertion of nodes since a last index assignment occurred.

10. The method of claim 9 wherein a structural change detector flags insertion of non-text nodes, wherein a text node insertion to change a value representative of an empty string to a value representative of non-empty string is regarded as an informational mutation, rather than a structural manipulation of the parse tree data structure.

11. The method of claim 9 wherein a language processor is responsive to an indication, by a language author using an attribute, indicating the requirement to apply, when executing a block of code associated with the attribute, at least one optimization from a set containing at least one of the following: binary tree projection, binary tree projection only on newly inserted nodes, height balancing, relaxed node index method, and variable negative index value assignment.

12. A computer program product for processing parse tree data, the computer program product comprising:
a non-transitory computer readable storage medium having program instructions embodied therewith, the program instructions executable by a processor to cause the processor to perform a method comprising:
receiving a parse tree data structure, wherein the parse tree data structure is representative of a document object model (DOM) tree data structure;
projecting the parse tree data structure received onto a data structure comprising a binary tree, wherein the projecting includes storing a projection that includes an association between each DOM node and a respective associated binary tree node thereby creating a map between the parse tree data structure and the binary tree data structure;
receiving a request to manipulate the parse tree data structure, wherein the request comprises an insert DOM node request for a new DOM node;
concomitant to receiving the request to manipulate the parse tree data structure, receiving an indication of a parse tree insert location for the new DOM node to be inserted;
responsive to receiving the indication of the parse tree insert location:
inserting the new DOM node at the indicated parse tree insert location;
creating a corresponding binary tree node;
associating the corresponding binary tree node with the new DOM node;
identifying a binary tree insertion point location for the corresponding binary tree node associated with the new DOM node; and
inserting the corresponding binary tree node into the binary tree at the identified binary tree insertion point location;
receiving a document order comparison request to determine an earlier of a first given DOM node and a second given DOM node;
responsive to receiving the document order comparison request, performing a binary tree document order comparison that comprises:
obtaining a first corresponding binary tree node associated by the projection with the first given DOM node and a second corresponding binary tree node associated by the projection with the second given DOM node;
determining which of the first corresponding binary tree node and the second corresponding binary tree node is earlier in a traversal order of the binary tree;
selecting a DOM node associated with a determined earlier corresponding binary tree node as the earlier DOM node; and
returning an indication of the selected earlier DOM node as the earlier of the first given DOM node and the second given DOM node; and
responsive to receiving an insert DOM node request for a new DOM node, identifying the binary tree insertion point location for the corresponding binary tree node associated with the new DOM node by:
obtaining a pre-order traversal predecessor DOM node, denoted P, of the new DOM node;
responsive to a determination P has an associated binary tree node, identifying a binary tree successor insertion location of the binary tree node associated with P;
responsive to a determination P does not have an associated binary tree node, determining the binary tree insertion point location using a specialized binary tree search using a value of the index of P; and performing a height balancing operation on the binary tree such that the binary tree is a height balanced binary tree (HBBT).

13. The computer program product of claim 12, wherein the projecting further includes:

storing an association between each DOM node in a successive pre-order traversal of the parse tree and each binary tree node in a traversal order of the binary tree wherein the traversal order is in a successive in-order traversal of the binary tree.

14. The computer program product of claim 12, wherein the program instructions are further executable by the processor for:

concomitant to receiving the parse tree data structure, receiving an assignment of index values for the DOM nodes consisting of distinct index values for each existing DOM node;

concomitant to inserting the new DOM node at the indicated parse tree insert location, assigning a distinguishable index value to the new DOM node, wherein the distinguishable index value is distinguishable from all distinct index values in the received assignment; and responsive to receiving the document order comparison request:

determining whether the document order comparison request can be satisfied by a comparison of the index values of the first given DOM node and the second given DOM node;

responsive to a determination that the document order comparison request can be satisfied by a comparison of the index values of the first given DOM node and the second given DOM node, selecting as the earlier DOM node one of the first given DOM node and the second DOM node based on the comparison of the index values of the first given DOM node and the second given DOM node; and responsive to a determination that the document order comparison request cannot be satisfied by the comparison of the index values of the first given DOM node and the second given DOM node, selecting as the earlier DOM node one of the first given DOM node and the second DOM node using the binary tree document order comparison.

15. The computer program product of claim 14, wherein the program instructions are further executable by the processor for:

assigning distinct index values using non-negative integers;

assigning a distinguishable index value for each new DOM node using a variable negative integer value whose absolute value is one greater than an absolute value of the index value of a pre-order traversal predecessor DOM node of the new DOM node;

responsive to a determination that the document order comparison request is satisfied by a comparison of index values of the first given DOM node and the second given DOM node based on an inequality of the index values, selecting as an earlier DOM node one of the first given DOM node and the second DOM node by performing a comparison of the index values of the first given DOM node and the second given DOM node.

16. The computer program product of claim 12, wherein the program instructions are further executable by the processor for:

receiving, by the processor, a request to manipulate the parse tree data structure, wherein the request comprises a delete DOM node request;

deleting from the parse tree data structure the DOM node for which deletion was requested; and deleting from the binary tree structure a corresponding binary tree node associated with the DOM node for which deletion was requested.

17. The computer program product of claim 16, wherein the program instructions are further executable by the processor for:

subsequent to receiving, by the processor, a request to manipulate the parse tree data structure, wherein the request comprises a delete DOM node request, performing the height balancing operation on the binary tree such that the binary tree is a HBBT.

18. The computer program product of claim 17, wherein the projecting initially stores no associations of DOM nodes to binary tree nodes, thereby creating an initially empty map between the parse tree data structure and an initially empty binary tree data structure, and the program instructions are further executable by the processor for:

responsive to receiving, by the processor, a delete DOM node request, deleting from the binary tree structure a corresponding binary tree node associated with the DOM node for which deletion was requested only when the DOM node has an associated binary tree node.

19. The computer program product of claim 18, wherein the program instructions are further executable by the processor for:

performing a re-index operation on the assignment of index values for the DOM nodes to assign distinct index values for each existing DOM node; and returning the projection and the binary tree data structure to an empty state.

20. An apparatus for processing parse tree data, the apparatus comprising:

a memory having computer readable instructions; and a processor configured to execute the computer readable instructions, the instructions comprising:

receiving a parse tree data structure, wherein the parse tree data structure is representative of a document object model (DOM) tree data structure;

projecting the parse tree data structure received onto a data structure comprising a binary tree, wherein the projecting includes storing a projection that includes an association between each DOM node and a respective associated binary tree node thereby creating a map between the parse tree data structure and the binary tree data structure;

receiving a request to manipulate the parse tree data structure, wherein the request comprises an insert DOM node request for a new DOM node;

concomitant to receiving the request to manipulate the parse tree data structure, receiving an indication of a parse tree insert location for the new DOM node to be inserted;

responsive to receiving the indication of the parse tree insert location:

inserting the new DOM node at the indicated parse tree insert location;

creating a corresponding binary tree node;

associating the corresponding binary tree node with the new DOM node;

identifying a binary tree insertion point location for the corresponding binary tree node associated with the new DOM node; and inserting the corresponding binary tree node into the binary tree at the identified binary tree insertion point location;

receiving a document order comparison request to determine an earlier of a first given DOM node and a second given DOM node;

responsive to receiving the document order comparison request, performing a binary tree document order comparison that comprises:

obtaining a first corresponding binary tree node associated by the projection with the first given DOM node and a second corresponding binary tree node associated by the projection with the second given DOM node;

determining which of the first corresponding binary tree node and the second corresponding binary tree node is earlier in a traversal order of the binary tree;

selecting a DOM node associated with a determined earlier corresponding binary tree node as the earlier DOM node; and returning an indication of the selected earlier DOM node as the earlier of the first given DOM node and the second given DOM node; and responsive to receiving, by the processor, an insert DOM node request for a new DOM node, the processor identifies the binary tree insertion point location for the corresponding binary tree node associated with the new DOM node by:

obtaining a pre-order traversal predecessor DOM node, denoted P, of the new DOM node;

responsive to a determination P has an associated binary tree node, identifying a binary tree successor insertion location of the binary tree node associated with P;

responsive to a determination P does not have an associated binary tree node, determining the binary tree insertion point location using a specialized binary tree search using a value of the index of P; and performing a height balancing operation on the binary tree such that the binary tree is a height balanced binary tree (HBBT).

\* \* \* \* \*